US012718182B2

(12) United States Patent
Ai

(10) Patent No.: US 12,718,182 B2
(45) Date of Patent: Aug. 25, 2026

(54) STREAM BASED FRAMEWORK FOR ASSOCIATING LOGISTICS DOCUMENTS USING CORRELATION FEATURES

(71) Applicant: SAP SE, Walldorf (DE)

(72) Inventor: Zhijie Ai, Shanghai (CN)

(73) Assignee: SAP SE, Walldorf (DE)

( * ) Notice: Subject to any disclaimer, the term of this patent is extended or adjusted under 35 U.S.C. 154(b) by 427 days.

(21) Appl. No.: 18/188,355

(22) Filed: Mar. 22, 2023

(65) Prior Publication Data

US 2024/0320606 A1 Sep. 26, 2024

(51) Int. Cl.
*G06Q 10/0833* (2023.01)
*G06Q 10/083* (2024.01)

(52) U.S. Cl.
CPC ..... *G06Q 10/0833* (2013.01); *G06Q 10/0838* (2013.01)

(58) Field of Classification Search
CPC ..... G06F 16/27; G06F 16/9024; G06F 16/901
See application file for complete search history.

(56) References Cited

U.S. PATENT DOCUMENTS 6,654,726 B1 * 11/2003 Hanzek .................. G06Q 10/08 705/26.81
10,068,199 B1 * 9/2018 Hwang .............. G06Q 10/0833
10,217,080 B1 * 2/2019 Dutta .................... G06Q 10/087
10,255,737 B1 * 4/2019 Eichenblatt .......... G06Q 10/083
10,311,442 B1 * 6/2019 Lancaster .............. G06Q 30/00
10,482,496 B1 * 11/2019 Recce ................ G06Q 30/0275

(Continued)

FOREIGN PATENT DOCUMENTS

CN 100378714 C * 4/2008
EP 4485229 A1 * 1/2025 ............. G06F 16/00

(Continued)

OTHER PUBLICATIONS

HT Kung, "On optimistic methods for concurrency control", ACM transactions on database systems, vol. 6, No. 2, Jun. 1981 (Year: 1981).*

(Continued)

*Primary Examiner* — Omar Zeroual
(74) *Attorney, Agent, or Firm* — Mintz Levin Cohn Ferris Glovsky and Popeo, P.C.

(57) ABSTRACT

A method includes determining a correlation feature shared among at least a portion of a plurality of tracking documents including a first tracking document and a second tracking document. The method includes receiving a first batch of tracking documents associated with a logistics process. The tracking documents includes the correlation feature and logistics information associated with the logistics process. The method includes generating a first correlation between the first tracking document and the second tracking document. The method includes receiving a second batch of tracking documents. The second batch includes a third tracking document including a change in the logistics information indicated by the first tracking document. The method includes generating a second correlation between the third tracking document and the second tracking document. The method includes sending a status of the logistics process. Related systems and computer program products are also provided.

16 Claims, 15 Drawing Sheets

(56) References Cited

U.S. PATENT DOCUMENTS 10,824,982 B1 * 11/2020 Whitehouse ....... G06Q 10/0832
11,488,093 B1 * 11/2022 Felix .................. G06Q 10/0838
12,265,531 B2 * 4/2025 De Silva ............. G06F 16/2272
2002/0035515 A1 * 3/2002 Moreno ............... B65G 1/0485 340/5.73
2003/0105704 A1 * 6/2003 Sundel ............... G06Q 10/0833 705/37
2003/0173403 A1 * 9/2003 Vogler ................. G06Q 10/087 235/385
2004/0054570 A1 * 3/2004 Streetman ........ G06Q 10/06315 705/7.25
2004/0111286 A1 * 6/2004 Koenig ................ G06Q 20/203 705/333
2004/0123293 A1 * 6/2004 Johnson .................. G06F 9/466 718/101
2004/0215480 A1 * 10/2004 Kadaba ..................... B07C 3/00 705/333
2005/0119786 A1 * 6/2005 Kadaba ..................... B07C 3/14 700/224
2005/0288993 A1 * 12/2005 Weng ..................... G06Q 10/06 705/7.31
2006/0020499 A1 * 1/2006 Aitipamula .......... G06Q 10/087 705/28
2006/0158326 A1 * 7/2006 Easley .................. G06Q 10/08 340/8.1
2006/0173797 A1 * 8/2006 Sheehan .......... G07B 17/00435 705/404
2006/0212309 A1 * 9/2006 Winkelman ..... G06Q 10/06312 705/333
2007/0192863 A1 * 8/2007 Kapoor ................... G06F 9/505 726/23
2007/0208680 A1 * 9/2007 Wang ................... G07G 1/0036 340/572.1
2008/0016502 A1 * 1/2008 Henderson ............ G06F 16/951 717/143
2008/0030342 A1 * 2/2008 Elizondo ............... H04J 3/0641 340/572.7
2008/0284569 A1 * 11/2008 Shah ...................... G06Q 10/06 340/10.1
2009/0057403 A1 * 3/2009 Marks .................. G06Q 10/087 235/385
2009/0112908 A1 * 4/2009 Wintel ................ G06F 16/2246 707/999.102
2009/0172003 A1 * 7/2009 Jentsch ................. G06F 16/289 707/999.102
2009/0287590 A1 * 11/2009 Hahn-Carlson ........ G06Q 40/03 705/40
2009/0292682 A1 * 11/2009 Robbins ................. G06Q 10/08 707/999.009
2010/0205220 A1 * 8/2010 Hart .................... G06F 16/9024 707/798
2011/0099121 A1 * 4/2011 Holley ................... G06Q 10/08 705/333
2012/0072462 A1 * 3/2012 Gu ...................... G06F 16/2246 707/E17.05
2012/0185421 A1 * 7/2012 Sundaravaradan .......................... G06Q 30/0283 706/45
2012/0209788 A1 * 8/2012 Sundel ................... G06Q 40/10 705/340
2013/0211870 A1 * 8/2013 Lawson .................. H04L 43/14 705/7.25
2014/0040081 A1 * 2/2014 Marwah ............ G06Q 10/0875 705/29
2015/0262320 A1 * 9/2015 Parameswaran ..... G06Q 20/385 705/44
2015/0324741 A1 * 11/2015 Parry ................ G06Q 10/0833 705/333
2016/0142868 A1 * 5/2016 Kulkarni ............... H04W 4/025 455/456.5
2016/0217399 A1 * 7/2016 Roelofs .................. G06Q 10/08
2016/0232489 A1 * 8/2016 Skaaksrud ......... G06Q 10/0836
2016/0314169 A1 * 10/2016 Wenzler ................ G06F 16/282
2016/0321685 A1 * 11/2016 Bagwell ............. G06Q 30/0202
2017/0061370 A1 * 3/2017 Choi .................. G06Q 10/0833
2017/0091244 A1 * 3/2017 Romanovskiy ..... G06F 16/2272
2017/0212951 A1 * 7/2017 Wenzler .................. G06F 16/93
2018/0075406 A1 * 3/2018 Kingston .............. H04L 9/0643
2018/0165349 A1 * 6/2018 Vaughan ................... G06F 7/08
2018/0321356 A1 * 11/2018 Kulkarni ................... G01S 5/14
2019/0156283 A1 * 5/2019 Abebe ................ G06Q 10/0838
2020/0137708 A1 * 4/2020 Blaser .................. G06Q 10/087
2020/0380326 A1 * 12/2020 Kawaguchi ............ H04B 1/401
2021/0055902 A1 * 2/2021 Blaser ................ G06Q 30/0281
2021/0158275 A1 * 5/2021 Helvie ............... G06Q 10/0838
2021/0158276 A1 * 5/2021 Helvie ................... G06Q 30/02
2022/0027163 A1 * 1/2022 Tuteja ................... G06F 9/5072
2022/0058189 A1 * 2/2022 Ai ......................... G06F 16/248
2022/0067651 A1 * 3/2022 Kawaguchi ........ G06Q 10/0833
2022/0109956 A1 * 4/2022 Volkerink ................. H02J 7/84
2022/0110189 A1 * 4/2022 Volkerink ............. H04W 4/029
2022/0207449 A1 * 6/2022 Cooks ................ G06Q 10/0833
2022/0207472 A1 * 6/2022 Hashisho ............... G06V 20/13
2022/0391822 A1 * 12/2022 Yuan .................. G06Q 10/0833
2024/0005023 A1 * 1/2024 Devarakonda ...... G06F 16/2246
2024/0037071 A1 * 2/2024 Le Mouel ............. G06F 16/185
2024/0119071 A1 * 4/2024 Guo ......................... G06F 16/93
2024/0144380 A1 * 5/2024 Viljoen .................. G16H 10/60
2024/0184644 A1 * 6/2024 McNabb ................. G06F 9/542

FOREIGN PATENT DOCUMENTS

WO WO-2006020200 A2 * 2/2006 ............. G06Q 10/08
WO WO-2015128232 A1 * 9/2015 ........... G06Q 10/087
WO WO-2024196913 A1 * 9/2024 ............. G06Q 16/00

OTHER PUBLICATIONS

TH Cormen, “Introduction to Algorithms”, 3rd ed., published by MIT press in 2009 (Year: 2009).*

* cited by examiner

| Identifier 452 | ... | Identification descriptor 456 | Creation Time 458 | Source Time 460 |
|---|---|---|---|---|
| 9001 | | Supplier Shipment | 12:01 pm | |
| 9003 | | Buyer Shipment | 12:02 pm | |
| 9003 | | Delivery | 12:03 pm | |
| 9004 | | Supplier Shipment | 12:12 pm | |
| 9005 | | Correlation | 12:19 pm | 12:01 pm |
| 9006 | | Correlation | 12:24 pm | 12:02 pm |
| 9007 | | PO item | 12:40 pm | |
| 9008 | | ID of deleted PO Item | 12:42 pm | |

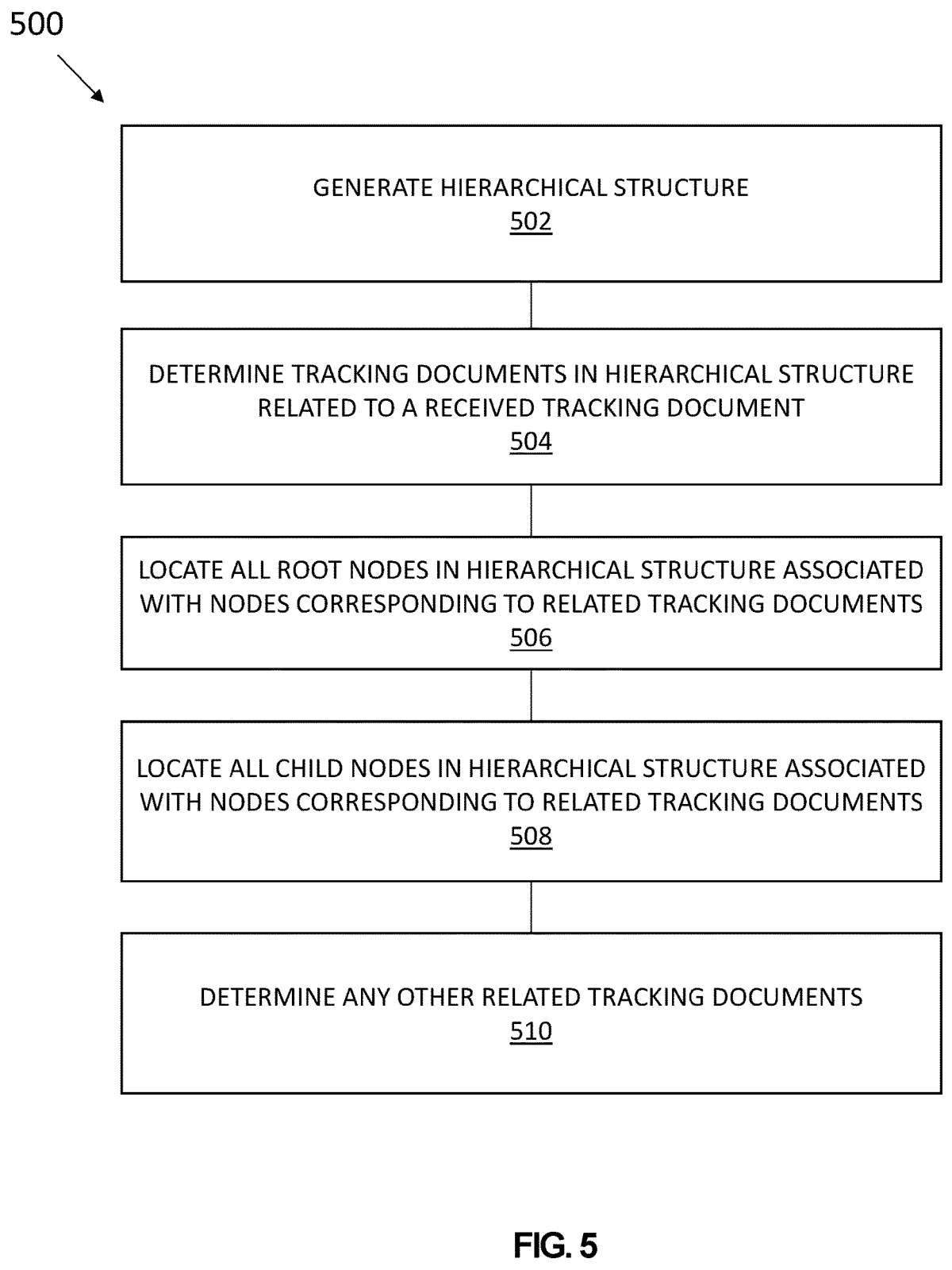

500

GENERATE HIERARCHICAL STRUCTURE
502

DETERMINE TRACKING DOCUMENTS IN HIERARCHICAL STRUCTURE RELATED TO A RECEIVED TRACKING DOCUMENT
504

LOCATE ALL ROOT NODES IN HIERARCHICAL STRUCTURE ASSOCIATED WITH NODES CORRESPONDING TO RELATED TRACKING DOCUMENTS
506

LOCATE ALL CHILD NODES IN HIERARCHICAL STRUCTURE ASSOCIATED WITH NODES CORRESPONDING TO RELATED TRACKING DOCUMENTS
508

DETERMINE ANY OTHER RELATED TRACKING DOCUMENTS
510

FIG. 5

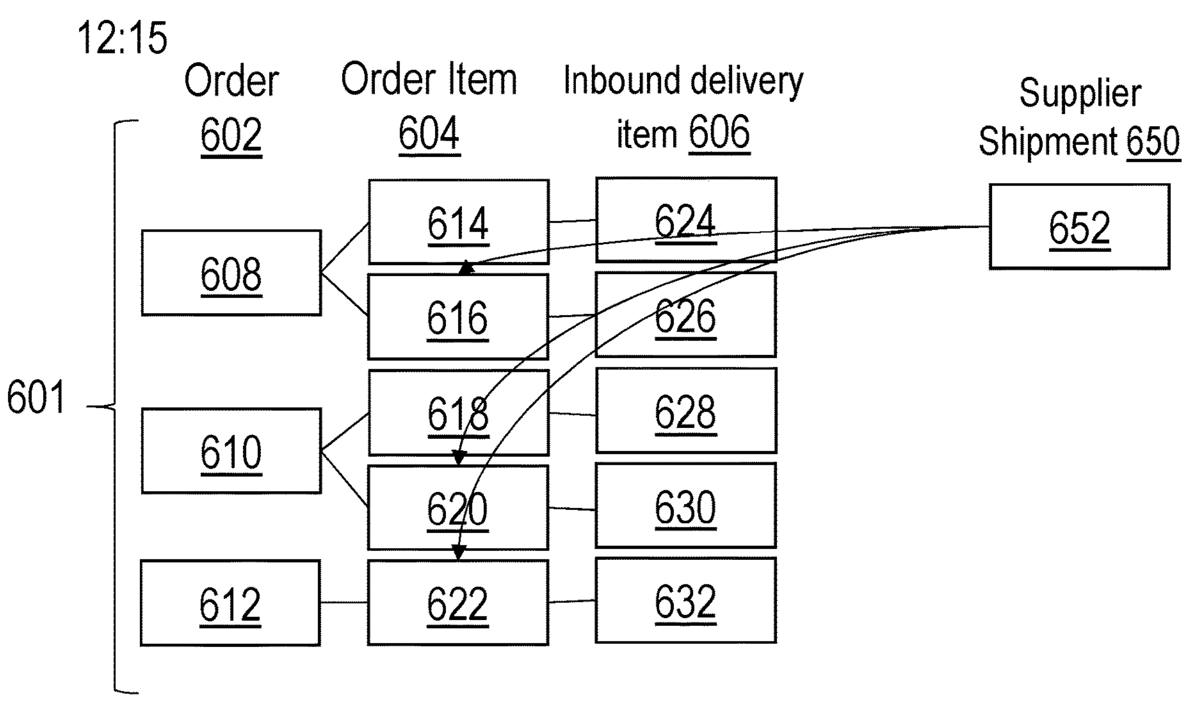
FIG. 6B

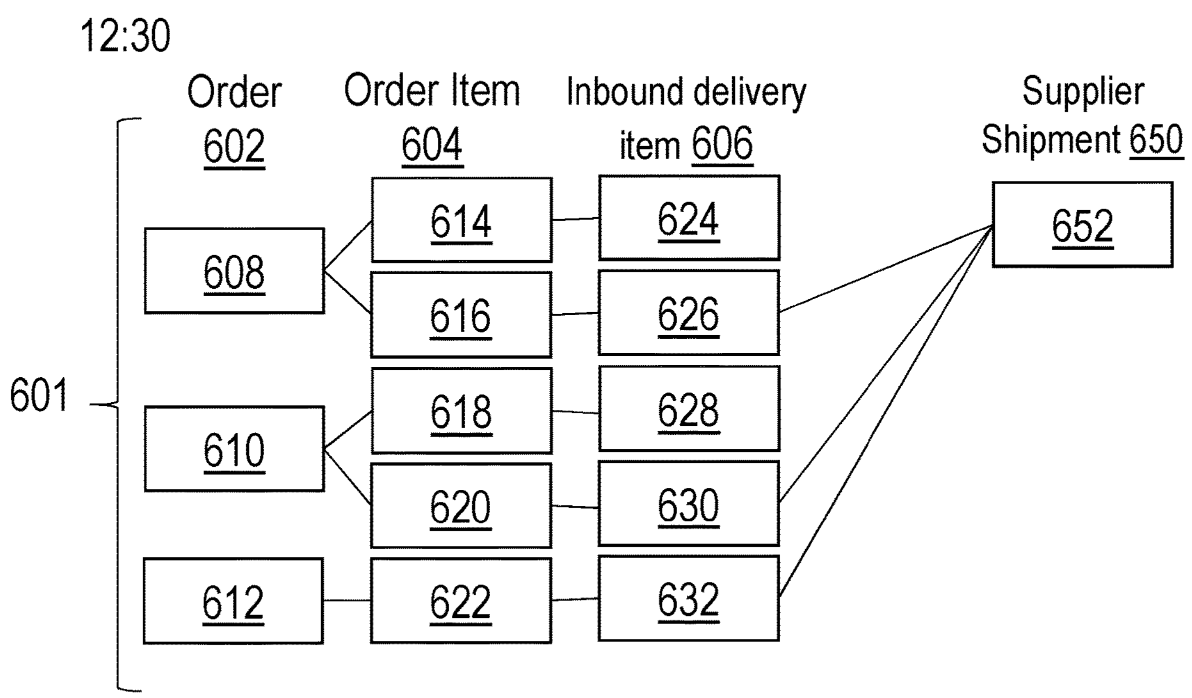
FIG. 6C

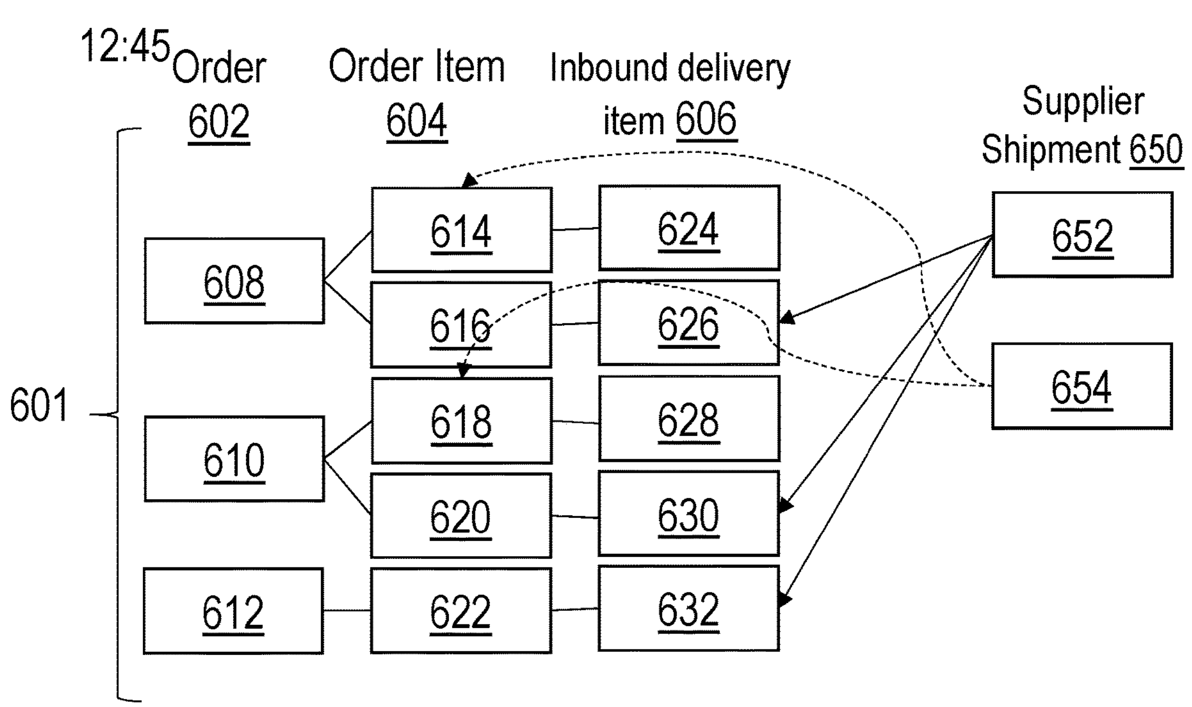
FIG. 6D

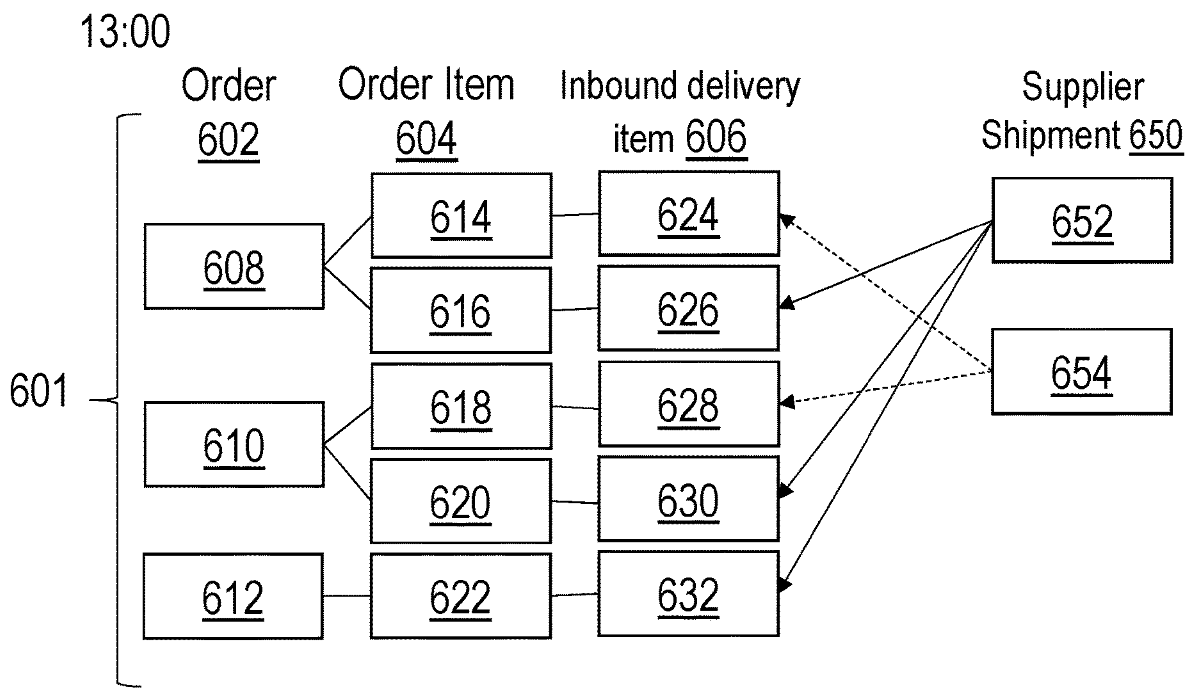
FIG. 6E

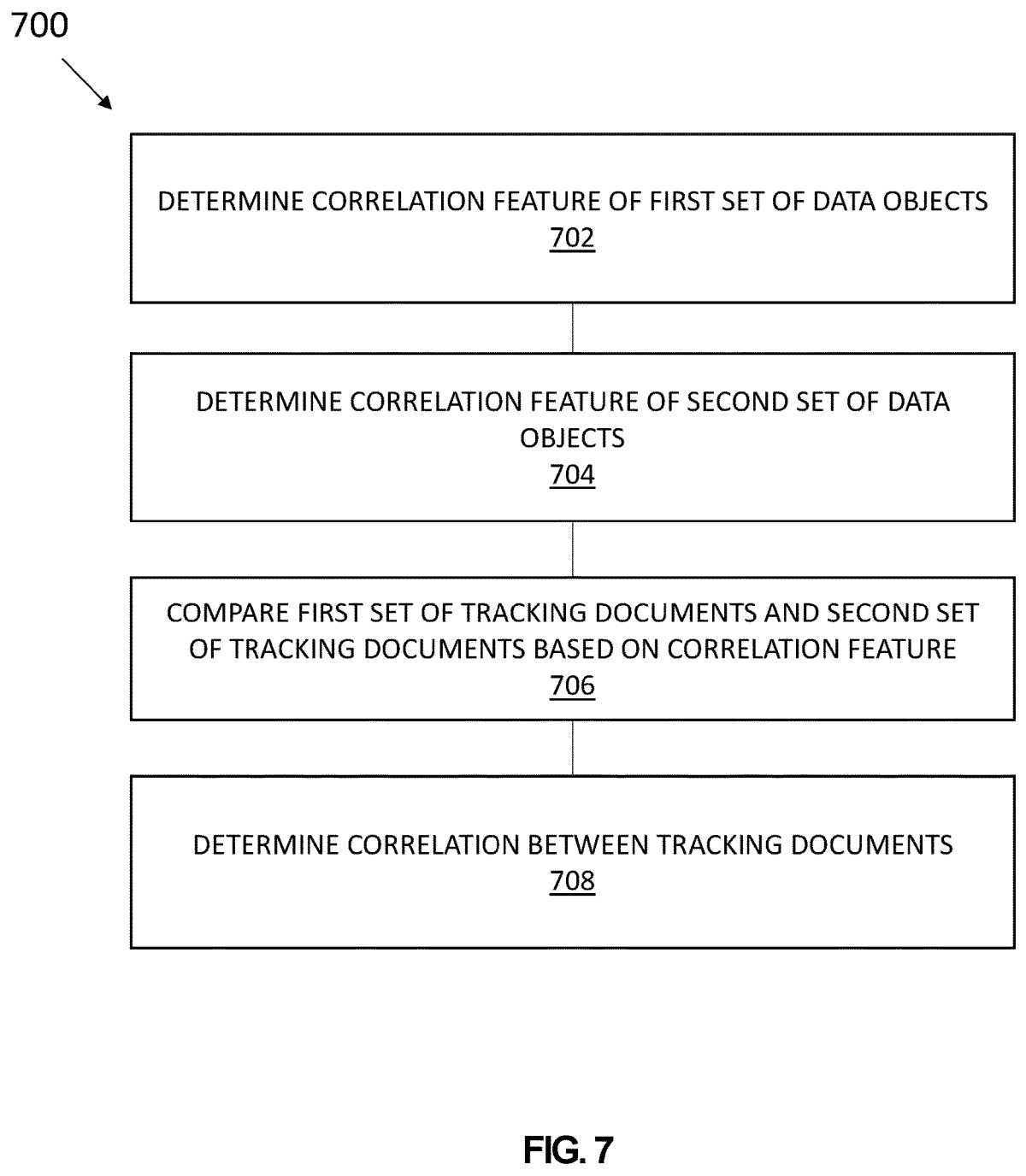

700

DETERMINE CORRELATION FEATURE OF FIRST SET OF DATA OBJECTS
702

DETERMINE CORRELATION FEATURE OF SECOND SET OF DATA OBJECTS
704

COMPARE FIRST SET OF TRACKING DOCUMENTS AND SECOND SET OF TRACKING DOCUMENTS BASED ON CORRELATION FEATURE
706

DETERMINE CORRELATION BETWEEN TRACKING DOCUMENTS
708

FIG. 7

| Table 802 | |
|---|---|
| **Inb Dlv Item 806** | **Related PO Items 808** |
| 1001 | 01, 02, 03 |
| 1002 | 04 |
| 1003 | 05 |

| Table 804 | |
|---|---|
| **Supplier SHP 810** | **Related PO Items 808** |
| 2001 | 01, 02, 03 |
| 2002 | 01, 04 |
| 2003 | 06 |

| **Joined Table 820** | |
|---|---|
| **Inb Dlv Item 806** | **Supplier SHP 810** |
| 1001 | 2001 |
| | 2002 |
| 1002 | 2002 |
| 1003 | N/A |

STREAM BASED FRAMEWORK FOR ASSOCIATING LOGISTICS DOCUMENTS USING CORRELATION FEATURES

TECHNICAL FIELD

The subject matter described herein relates a stream based framework for associating logistics or tracking documents using correlation features.

BACKGROUND

An enterprise may rely on a suite of enterprise software applications for sourcing, procurement, supply chain management, invoicing, and payment. The operations of the enterprise may also give rise to a variety of electronic documents including, for example, purchase orders, sales contracts, licensing agreements, and/or the like. As such, the enterprise software applications may integrate various electronic document management features. For example, an electronic document may include structured data or non-structured data, both of which may be stored in a data repository, such as a relational database, a graph database, an in-memory database, a non-SQL (NoSQL) database, a key-value store, a document store, and/or the like. The enterprise software applications may manage an electronic document throughout its lifecycle, including creation, compliance, execution, and archiving.

SUMMARY

Systems, methods, and articles of manufacture, including computer program products, are provided for a stream based framework for correlating logistics or tracking documents using correlation features. In some example embodiments, there is provided a system that includes at least one processor and at least one memory. The at least one memory may include program code that provides operations when executed by the at least one processor. The operations may include: determining a correlation feature shared among at least a portion of a plurality of tracking documents including a first tracking document and a second tracking document. The operations include receiving a first batch of tracking documents associated with a logistics process. The tracking documents include the correlation feature and logistics information associated with the logistics process. The first batch of tracking documents includes the first tracking document and the second tracking document. The operations include generating, based at least on the correlation feature, a first correlation between the first tracking document and the second tracking document. The operations include receiving, after beginning generation of the first correlation, a second batch of tracking documents associated with the logistics process. The second batch of tracking documents includes a third tracking document including a change in the logistics information indicated by the first tracking document of the first batch. The operations include generating, based at least on the correlation feature and the change, a second correlation between the third tracking document of the second batch and the second tracking document of the first batch. The operations include sending, based at least on the second correlation, a status of the logistics process. The status indicating at least the change.

In another aspect, there is provided a method for implementing a stream based framework for correlating tracking documents. The method may include: determining a correlation feature shared among at least a portion of a plurality of tracking documents including a first tracking document and a second tracking document. The method includes receiving a first batch of tracking documents associated with a logistics process. The tracking documents include the correlation feature and logistics information associated with the logistics process. The first batch of tracking documents includes the first tracking document and the second tracking document. The method includes generating, based at least on the correlation feature, a first correlation between the first tracking document and the second tracking document. The method includes receiving, after beginning generation of the first correlation, a second batch of tracking documents associated with the logistics process. The second batch of tracking documents includes a third tracking document including a change in the logistics information indicated by the first tracking document of the first batch. The method includes generating, based at least on the correlation feature and the change, a second correlation between the third tracking document of the second batch and the second tracking document of the first batch. The method includes sending, based at least on the second correlation, a status of the logistics process. The status indicating at least the change.

In another aspect, there is provided a computer program product including a non-transitory computer readable medium storing instructions. The instructions may cause operations may executed by at least one data processor. The operations may include: determining a correlation feature shared among at least a portion of a plurality of tracking documents including a first tracking document and a second tracking document. The operations include receiving a first batch of tracking documents associated with a logistics process. The tracking documents include the correlation feature and logistics information associated with the logistics process. The first batch of tracking documents includes the first tracking document and the second tracking document. The operations include generating, based at least on the correlation feature, a first correlation between the first tracking document and the second tracking document. The operations include receiving, after beginning generation of the first correlation, a second batch of tracking documents associated with the logistics process. The second batch of tracking documents includes a third tracking document including a change in the logistics information indicated by the first tracking document of the first batch. The operations include generating, based at least on the correlation feature and the change, a second correlation between the third tracking document of the second batch and the second tracking document of the first batch. The operations include sending, based at least on the second correlation, a status of the logistics process. The status indicating at least the change.

In some variations of the methods, systems, and non-transitory computer readable media, one or more of the following features can optionally be included in any feasible combination. The logistics process is tracked by the plurality of tracking documents. The logistics process includes one or more events associated with placing an order, shipping the order, and/or receiving the order. The logistics information includes a value indicative of a quantity of an item included in the order, a type of the item included in the order, a buyer of the item, a shipper of the item, a date of the order, a delivery date of the order, and/or a price of the order. The first tracking document includes the order, an order item included in the order, an inbound delivery item for the order item, and/or shipment of the order including the inbound delivery item. The correlation feature includes an identifier shared among at least the portion of the tracking documents to enable the first correlation and the second correlation. Determining the correlation feature further includes determining the correlation feature based on content derived from the plurality of tracking documents and/or based on an indication received via a user interface, wherein the received indication is used as the correlation feature. The correlation feature includes a value indicative of an order, an order item included in the order, an inbound delivery item included in the order, and/or a shipment of the order. Generating the first correlation includes: determining each of the first tracking document and the second tracking document contains the value or references another tracking document of the first batch of tracking documents that includes the value; and storing the first correlation between the first tracking document and the second tracking document to enable tracking of the logistics process. A subset of the tracking documents forms a hierarchical structure including a plurality of nodes corresponding to the subset of the tracking documents. The subset of the tracking documents includes the first tracking document. The second tracking document is not included in the subset. The second tracking document includes a second reference to the first tracking document of the subset. Generating the first correlation includes locating root nodes associated with at least one node corresponding to the first tracking document and leaf nodes associated with the at least one node by at least recursively searching the hierarchical structure to determine whether another tracking document is correlated with the first tracking document. The first correlation is assigned a source time indicating when the first tracking document is received. The operations and/or method further includes: determining whether the source time matches a creation time indicating when the third tracking document was received; updating, based on a determination that the source time does not match the creation time, the first correlation to generate the second correlation; and storing the second correlation.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a flowchart illustrating an example of a process for performing a relation search of tracking documents, in accordance with some example embodiments;

FIG. 6B depicts a diagram illustrating a tracking document relationship in an example tracking document tree, in accordance with some example embodiments FIG. 6C depicts a diagram illustrating a tracking document relationship in an example tracking document tree, in accordance with some example embodiments FIG. 6D depicts a diagram illustrating a tracking document relationship in an example tracking document tree, in accordance with some example embodiments FIG. 6E depicts a diagram illustrating a tracking document relationship in an example tracking document tree, in accordance with some example embodiments FIG. 7 depicts a flowchart illustrating an example of a process for determining correlations between tracking documents, in accordance with some example embodiments;

DETAILED DESCRIPTION

Figure 1:
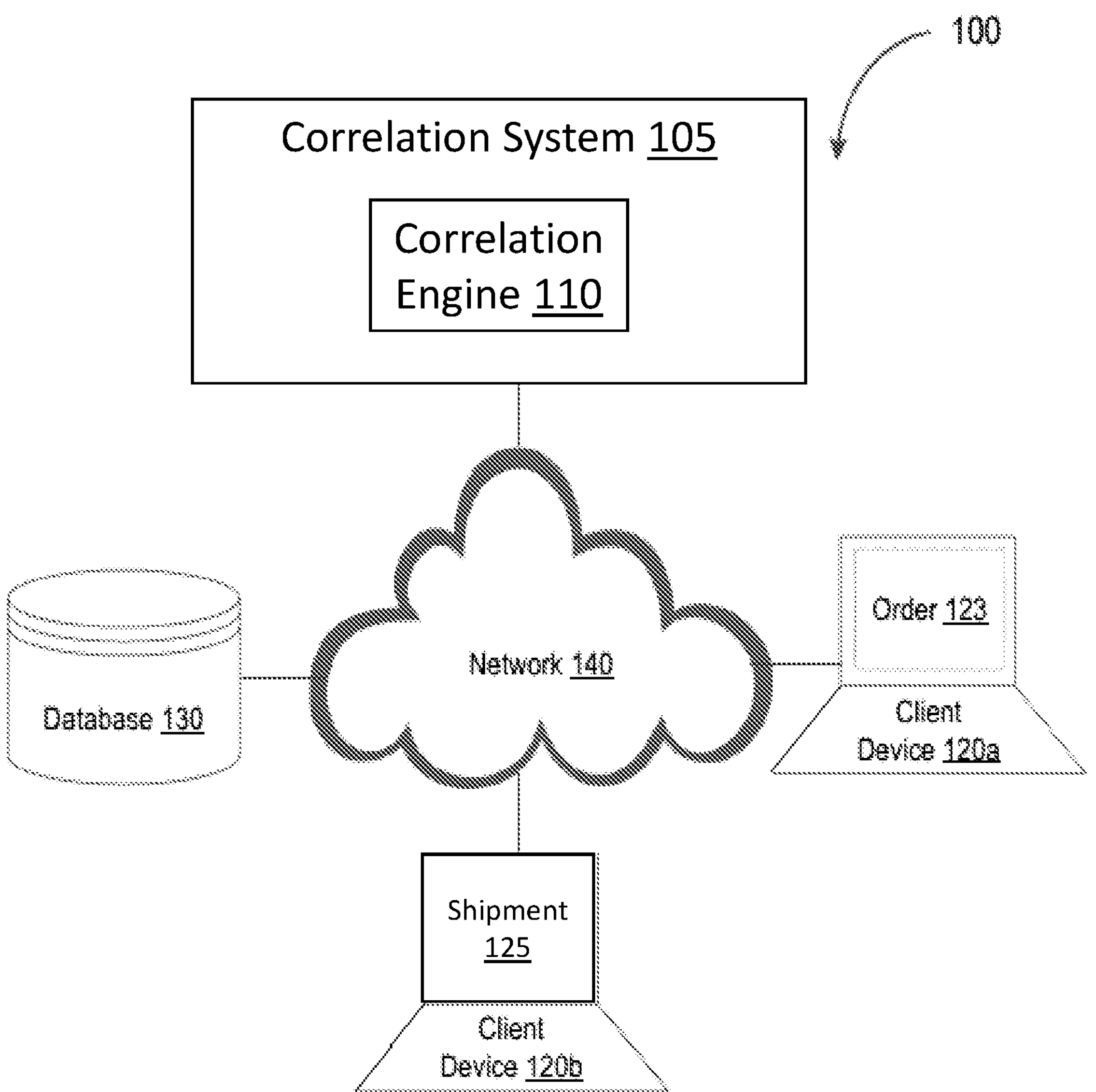
FIG. 1 depicts a system diagram illustrating an example of an enterprise software system, in accordance with some example embodiments.

Enterprise software applications may provide a variety of procurement and supply chain management solutions while integrating document management features for the electronic documents (e.g., purchase orders, sales contracts, licensing agreements, and/or the like) that may arise as a part of a logistics process. As described herein, the logistics process may include placing an order, shipping the order, receiving the order, and/or the like. In other words, the logistics process may include events (e.g., placement of an order, shipping an order, and so forth) that triggers creation of one or more documents that track the event or process. As used herein, the term "document" refers to an "electronic document."

However, conventional enterprise software solutions can lack sufficient transparency for every stakeholder participating in a transaction and are unable to effectively track logistics information associated with the logistics process. For example, the logistics information may include a value indicative of a quantity of an item included in the order, a type of the item included in the order, a buyer of the item, a shipper of the item, a date of the order, a delivery date of the order, a price of the order, and/or the like. In some examples, logistics information includes logistics documents or events that track various aspects of an order, such as a purchase order or a sales order between a purchaser and a supplier that may be received from different purchaser systems. The logistics information may additionally and/or alternatively include data, such as an identifier of a logistics document or event, an identification of a type of the logistics document or event, a time stamp associated with creation of the logistics document or event, a time stamp associated with receipt of the logistics document or event, sender information associated with a sender or creator of the logistics document or event, vendor or shipper information associated with a vendor or shipper associated with fulfilling a request included in the logistics document or event, and/or the like.

Enterprise software applications may use different logistics providers or streams for handling (e.g., placing, fulfilling, supplying, and/or shipping) a request, such as the purchase orders associated with the logistics documents or events. In turn, the enterprise software applications may receive and/or send logistics information as part of tracking documents (e.g., electronic documents, physical documents, or the like, that are sent and/or received as part of the logistics process) to one or more other enterprise software applications for processing. As a result, the management of logistics information related to the logistics process can be complex. Further contributing to the complexity of tracking logistics information, logistics suppliers (e.g., streams) may be external to the enterprise software applications (e.g., as a way to maintain security of the enterprise software applications). Instead, these logistics suppliers may communicate with the enterprise software applications via an externally-facing application programming interface (API), such as a secure entry application or microservice that isolates the internal and external portions of the enterprise software system. Using the secure entry application, a logistics provider can create logistics (e.g., shipments) to fulfill purchase orders, and submit a corresponding logistics order number. As noted, due to the various enterprise software applications (e.g., streams) and the large quantity of logistics information monitored by and/or transferred between the enterprise software applications, it can be difficult to track the logistics information and tracking documents, and status of the logistics process.

Further, conventional enterprise software systems, including enterprise logistics systems, may suffer from the fragmentation of the enterprise logistics system and the logistics information flowing between each enterprise software application within the overall enterprise logistics system at different times. As a result, it can be difficult to correlate and/or track related logistics processes and logistics information across the overall enterprise logistics system. As an example, an order, such as a purchase order, created at an enterprise resource planning software application may include one or more order items, such as purchase order items, and each order item may correspond to an inbound delivery item. A logistics provider may then create a shipment by referring to the order, such as the purchase order or the order item, via a microservice or other software application in communication with the enterprise resource planning software application. Although the shipment in this example is created based on the order item information, the shipment may be associated with the inbound delivery item. However, due to the fragmentation of the overall logistics enterprise software system, the inbound delivery item may not be readily correlated with the shipment. Further, even for associated logistics information, conventional enterprise software systems may be unable to efficiently handle changes to the associated logistics information that occur at different times, network delays, system delays, and/or the like. In contrast, the enterprise software system described herein efficiently correlates tracking documents including the logistics information via a central correlation system, allowing for quick and accurate tracking of the logistics information associated with a logistics process.

In some embodiments consistent with the current subject matter, the enterprise software system links tracking documents (which include logistics information having corresponding correlation features) across the various enterprise software applications. The tracking documents may include (or map to) the logistics information.

Figure 2A:
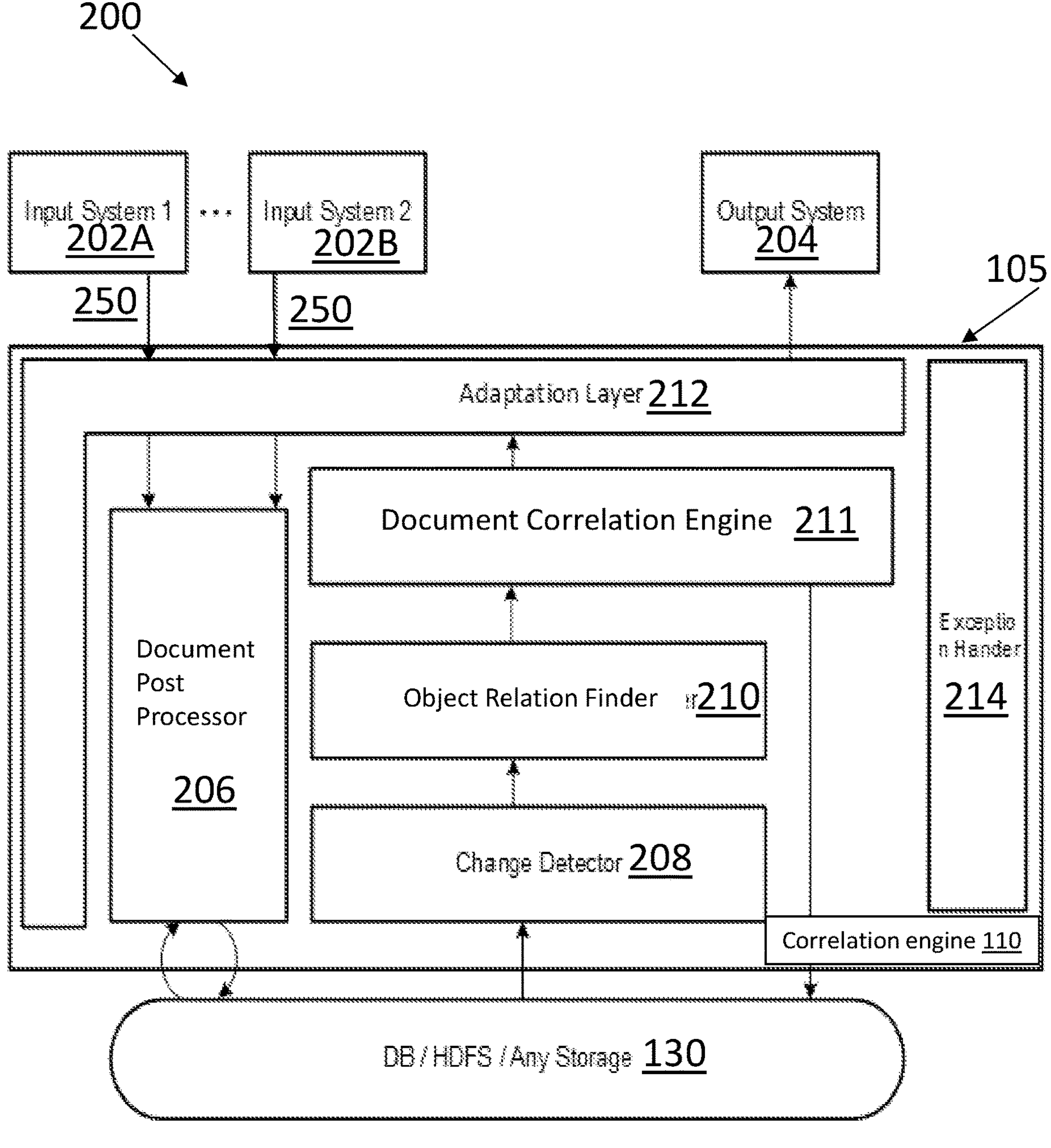
FIG. 2A depicts a schematic diagram illustrating an example of an enterprise software system, in accordance with some example embodiments.
Figure 2B:
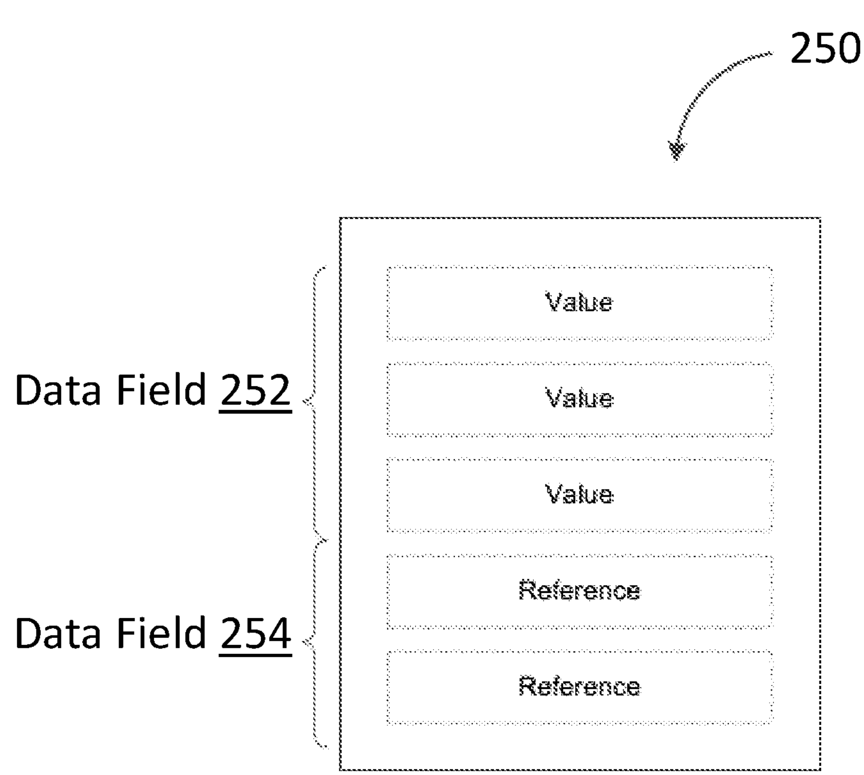
FIG. 2B depicts a schematic diagram illustrating an example of a tracking document, in accordance with some example embodiments.

As described with respect to at least FIG. 2B, the tracking documents may include data structures (e.g., tables) or entries (e.g., a row or a record) within the data structures holding data values (e.g., the logistics information data described herein), references to other tracking documents, and/or a correlation feature. The correlation feature may be a value (e.g., a numeric, alphanumeric, and/or alphabetical value) included in the tracking documents to allow the tracking documents to be correlated. The correlation feature may include an identifier (e.g., a numeric, an alphanumeric, an alphabetical, or the like, identifier) shared among at least some of the tracking documents. In some embodiments, the correlation feature is derived from the tracking documents or received, via a user interface, to enable generation of a correlation (e.g., a first correlation, a second correlation, and/or the like), such as a correlation between two or more tracking documents. The correlation feature may include a value (e.g., logistics information) associated with the logistics process, such as at least one of an order (e.g., a purchase order), an order item included in the order, an inbound delivery item included in the order, and shipment of the order. The correlation feature may thus be used to link two or more tracking documents, such as when two or more tracking documents include the same value of the correlation feature.

To illustrate the use of the correlation feature, a tracking document may be received from a first logistics provider, such as a purchaser, and the tracking document may include a correlation feature having a value that is associated with an inbound delivery item being delivered to the purchaser. And, another tracking document may be received from another logistics provider, such as a supplier; this other tracking document may include a correlation feature having the same value associated with the inbound delivery item being delivered to the purchaser. In this example, the correlation system may link the two tracking documents received from different logistics providers (e.g., streams), and this linking may be performed using the correlation feature, such as the two tracking documents sharing the same value associated with the inbound purchased item being delivered to the purchaser.

In some implementations, the correlation system may receive tracking documents from one or more streams (e.g., one or more logistics providers). In some embodiments, the correlation system receives tracking documents in batches. For example, a first batch may include one or more tracking documents, and a second batch may include one or more other tracking documents received after beginning generation of a correlation between at least two of the tracking documents from the first batch.

The batches of tracking documents may be associated with the logistics process and may include a first tracking document, a second tracking document, a third tracking document, a fourth tracking document, and/or the like. A tracking document may correspond to an order (e.g., a purchase order that undergoes an inbound procurement process or a sales order that undergoes an outbound sales process), an order item (e.g., a purchase order item) included in the order, an inbound delivery item corresponding to the order item, the shipment including at least the inbound delivery item, and/or the like. It should be appreciated that the inbound delivery item may include one or more inbound delivery items. For example, the inbound delivery item may be an aggregate of a plurality of inbound delivery items. It should also be appreciated that the shipment may contain multiple orders.

In some embodiments, the tracking document corresponding to the order item may be linked to the tracking document representing the order. The tracking document corresponding to the inbound delivery item may be linked to the tracking document corresponding to the order item and/or the tracking document representing the order. The tracking document corresponding to the shipment may be linked to at least one of the tracking document representing the order, the tracking document corresponding to the order item, and the tracking document corresponding to the inbound delivery item. Accordingly, the tracking documents may include the logistics information received, by the correlation system, such as from one or more streams (e.g., one or more logistics providers).

The correlation system may correlate and/or track the tracking documents across one or more enterprise software systems. As used herein, a correlation between two or more tracking documents (e.g., the first tracking document, the second tracking document, the third tracking document, the fourth tracking document, and/or the like) refers to an association between the two or more tracking documents determined based at least on a relationship between the two or more tracking documents. The relationship between the two or more tracking documents may be defined at least by the correlation features, which can be a value included in the two or more tracking documents. In other words, the correlation system may correlate tracking documents when the value of the correlation feature is the same across the tracking documents.

For example, the tracking document corresponding to the order, the tracking document corresponding to the order item, and/or the tracking document corresponding to the inbound delivery item may be received from a first enterprise software application, while the tracking document associated with the shipment may be received from a second enterprise software application. The correlation system may correlate and/or track the tracking documents by accessing the tracking documents and using one or more correlation features found in the documents. The correlation feature may be any value (e.g., a numerical quantity or other value) included in the tracking documents that can be used to correlate the tracking documents. For example, the correlation feature may be may be a value found in at least two of the tracking documents, or found in a document referenced by at least two of the tracking documents. Thus, tracking documents may be correlated when each of the tracking documents share a common correlation feature, such as a common value (e.g., a common numerical quantity) or when each of the tracking documents reference another tracking document including the value.

The correlation system may generate one or more correlations (e.g., links) between a plurality of the tracking documents. The correlations may link the correlation feature, the logistics information included in the tracking documents, the data structures included in the tracking documents, and/or the like. For example, the correlation system may generate a first correlation (e.g., a first link) between at least two tracking documents (e.g., a first tracking document and a second tracking document) of a first batch of the tracking documents. As the tracking documents may be received in a serial stream or in batches, the correlation system may further generate a second correlation between a tracking document of a second batch of the tracking documents and at least one of the tracking documents of the first batch. This tracking document of the second batch may include a change, which is indicative of a change (e.g., update, modification, and/or the like) in the logistics information of a tracking document of the first batch. Thus, the second correlation may be an update to the first correlation to incorporate the change. The correlation system may additionally and/or alternatively generate a second correlation between at least two tracking documents of the second batch. For example, the correlation system may generate a first correlation (e.g., a first link or mapping) between tracking documents of a first batch corresponding to order placed, payment received, and item shipped, while second batch may include a third document indicative of a change to the order shipped (e.g., a change to the item), a change to the shipment information, and/or the like. The correlating may thus correlate these three documents despite the fact that the third document was received later in time or by another source.

In some example embodiments, the correlation system described herein may send, based at least on the correlation (e.g., the second correlation), a status of the logistics process, such that the status takes into account at least the change. For example, the status may indicate that there was a change to the order shipment, such as a change to the item, a change to the shipment data, and/or the like. Accordingly, the correlation system may efficiently track the logistics process and/or the tracking documents received from various enterprise software applications as part of the logistics process.

FIG. 1 depicts a system diagram illustrating an example of an enterprise software system 100, in accordance with some example embodiments. Referring to FIG. 1, the enterprise software system 100 may include a correlation system 105 including a correlation engine 110, one or more client devices, such as first client device 120*a* and second client device 120*b* (each of which is associated with one or more enterprise software applications), and a database 130. The correlation system 105, the one or more client devices, and the database 130 may be communicatively coupled via a network 140. The one or more client devices 120 may be a processor-based device including, for example, a smartphone, a tablet computer, a wearable apparatus, a virtual assistant, an Internet-of-Things (IoT) appliance, and/or the like. The database 130 may be a database including, for example, a relational database, a non-structured query language (NoSQL) database, an in-memory database, a graph database, a key-value store, a document store, and/or the like. The network 140 may be any wired network and/or a wireless network including, for example, a wide area network (WAN), a local area network (LAN), a virtual local area network (VLAN), a public land mobile network (PLMN), the Internet, and/or the like.

To further illustrate, FIG. 2A depicts a schematic diagram 200 illustrating an example of the enterprise software system 100 (shown in FIG. 1), in accordance with some example embodiments. As shown in the diagram 200, the correlation system 105 includes the correlation engine 110. The correlation engine 110 may include at least one data processor and at least one memory storing instructions, which when executed by the at least one data processor cause various operations, such as for implementing a stream based framework for associating logistics or tracking documents using correlation features.

FIG. 2B depicts a schematic diagram illustrating an example of a tracking document 250, in accordance with some example embodiments. In some example embodiments, the tracking document 250 may include one or more of a first tracking document representing the order (e.g., purchase order), a second tracking document corresponding to an order item (e.g., an item being purchased with the purchase order) included in the order, a third tracking document corresponding to an inbound delivery item corresponding to the order item of the second tracking document, and/or the like. In some cases, the tracking document 250 may include a data structure (e.g., a table) or an entry (e.g., a row or a record) within the data structure holding data values and/or references to other tracking documents.

In the example shown in FIG. 2B, the tracking document 250 may include fields 252 and fields 254. The fields 252 and/or the fields 254 may include the logistics information included in the tracking document. For example, the fields 252 and/or the fields 254 may include values indicative of a quantity of an item included in the order, a type of the item included in the order, a buyer of the item, a shipper of the item, a date of the order, a delivery date of the order, a price of the order, and/or the like. Additionally and/or alternatively, the fields 252 may include correlation features, such as the values indicating an identifier, a description, a type, a status, a location, an expected delivery time, a source, a creation time, a change time, and/or the like. Furthermore, the fields 254 may include references to other tracking documents. For example, where the tracking document 250 corresponds to the order, the data fields 254 may include an identifier of the corresponding order item (e.g., a second tracking document) included in the order, an identifier of an inbound delivery item (e.g., a third tracking document) corresponding to the order item, and/or the like.

Referring back to FIG. 2A, the correlation engine 110 may receive tracking documents including logistics information from one or more input systems (or from streams associated with, for example, logistics providers). For example, the correlation engine 110 receives an input, such as one or more tracking documents 250 including the logistics information. The correlation engine 110 receives the input via one or more input systems or streams, such as a first input system 202A, a second input system 202B, and/or the like. The one or more input systems may be one or more microservices or enterprise software applications. For example, the one or more input systems may include an enterprise resource planning system, a transportation document system, and/or the like, via which a purchaser, a shipper or the like creates the one or more tracking documents.

In some embodiments, the first input system 202A is associated with the first client device 120*a* (see FIG. 1) and the second input system 202B is associated with the second client device 120*b* (see FIG. 1). As an example, the first client device 120*a* may be associated with a purchaser and the second client device 120*b* may be associated with a supplier, shipper, or logistics provider. Thus, the first input system 202A may correspond to the purchaser and the second input system 202A may correspond to the supplier, shipper, or logistics provider.

Referring again to FIG. 1 and FIG. 2A, the correlation engine 110 may receive one or more tracking documents 250 via the first input system 202A and/or the first client device 120*a*. The one or more tracking documents 250 received via the first input system 202A may be associated with an order 123 (e.g., a purchase order, a sales order, and/or the like) between a purchaser and a supplier. Moreover, the order 123 may include one or more inbound delivery items, each of which may be shipped in a corresponding shipment 125 generated at the second client device 120*b* associated with the supplier, shipper, and/or logistics provider. For example, the one or more tracking documents 250 received via the first input system 202A may include a tracking document corresponding to the order, a tracking document corresponding to an order item (e.g., a purchase order) included in the order 123, a tracking document corresponding to an inbound delivery item (e.g., one or more aggregated inbound delivery items) associated with the order item, and/or the like. Thus, the purchaser may create the one or more tracking documents 250 received via the first input system 202A during and/or based on creation of the order 123.

The correlation engine 110 may receive one or more tracking documents 250 via the second input system 202B and/or the second client device 120*b*. The one or more tracking documents 250 received via the second input system 202B may be associated with a shipment 125. The shipment 125 may include (e.g., reference) the inbound delivery item. Thus, the supplier, logistics provider, and/or shipper may create the one or more tracking documents 250 received via the second input system 202B during and/or based on creation of the shipment 125. The correlation engine 110 may receive the one or more tracking documents 250 via the first input system 202A and/or the second input system 202B in any order.

Referring to FIG. 2A, the correlation system 105 (e.g., the correlation engine 110) includes a document post processor 206, a change detector 208, a document relation finder 210, a document correlation engine 211, an adaption layer 212, and/or an exception handler 214. The document post processor 206, the change detector 208, the document relation finder 210, the document correlation engine 211, the adaption layer 212, and/or the exception handler 214 may form separate components of the correlation system 105 and/or may form a part of the correlation engine 110.

In some embodiments, the adaptation layer 212 provides an interface specification. For example, the adaptation layer 212 adapts the input (e.g., the one or more tracking documents 250) received from the first input system 202A and/or the second input system 202B to a standard format. As an example, the adaptation layer 212 may add one or more fields to the input tracking documents 250 and store the input tracking documents 250 and the created one or more fields in the database 130 via the document post processor 206. In some embodiments, the adaptation layer 212 exports the output 204 from the correlation engine 110 (e.g., the document correlation engine 211) in the appropriate format. For example, the output 204 may include a status of the order 123 and/or the shipment 125 provided by the correlation engine 110 based at least on the stored correlation. The status allows the purchaser and/or the logistics supplier to track the logistics process, including the order 123 and/or the shipment 125 across one or more streams.

Referring to FIG. 2A, the change detector 208 retrieves generated correlations from the database 130. The change detector 208 compares the correlations to determine whether received tracking documents include changes that correct errors in previously received tracking documents, whether a stored correlation should be updated to incorporate the change, and/or the like. The document relation finder 210 may determine and/or locate one or more correlations or relationships between the tracking documents (see, e.g., FIGS. 5-6E). The document correlation engine 211 may generate the correlations or otherwise process the tracking documents based at least on the relationships between the tracking documents received from the document relation finder 210. The document correlation engine 211 may store the generated correlations in the database 130. The exception handler 214 may handle a logistic exception, such as a delay, associated with the shipment.

Figure 3:
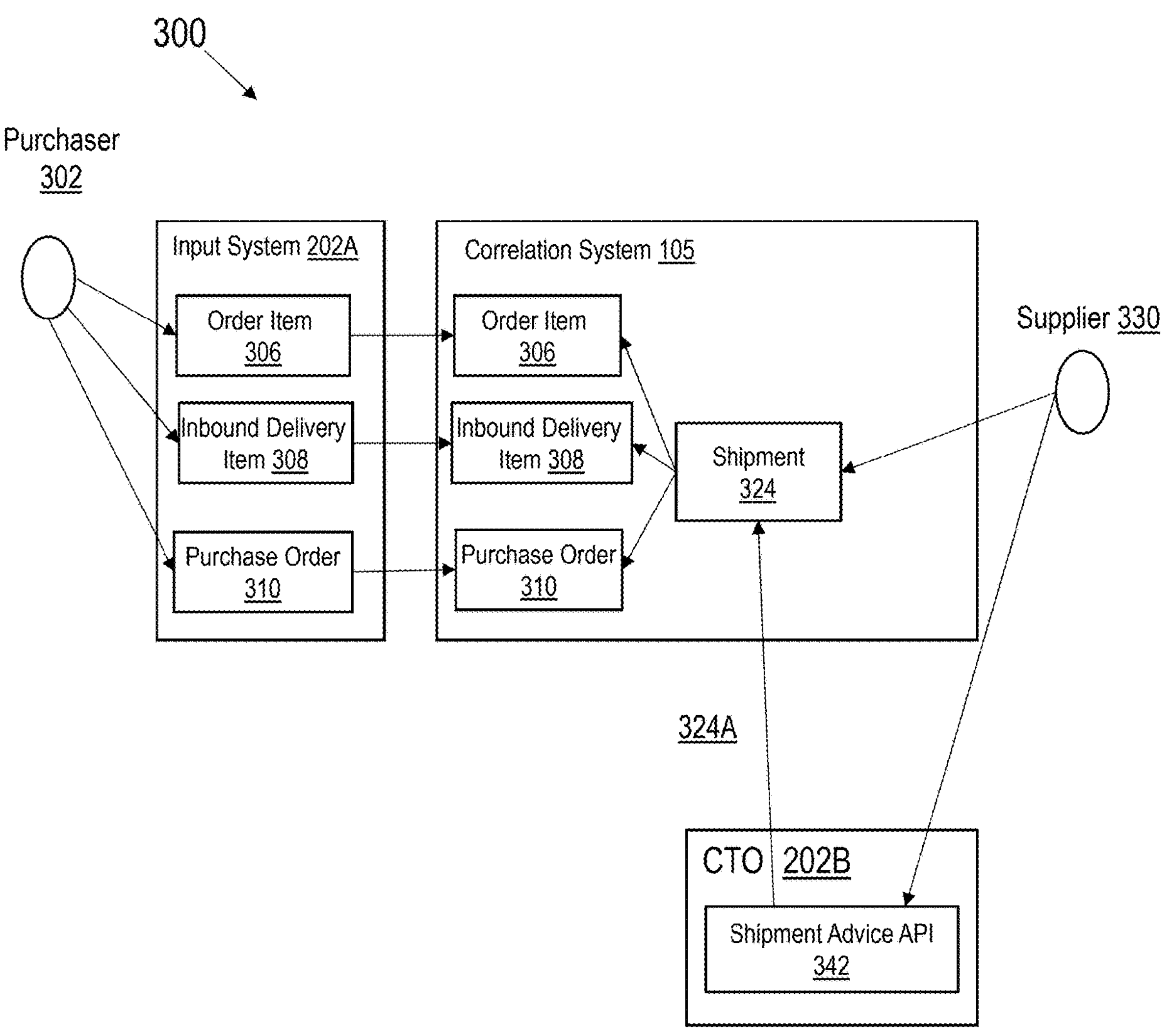
FIG. 3 depicts a block diagram illustrating an example of a logistics process, in accordance with some example embodiments.

FIG. 3 illustrates an example logistics scenario 300, in accordance with some example embodiments. In the example logistics scenario 300, tracking documents may be received by the correlation system 105 in any order, such as part of any sequence.

For example, a purchaser 302 creates one or more tracking documents via the first input system 202A (e.g., the first client device 120*a*). The tracking documents (which are created via the first input system 202A) include a first tracking document 310, a second tracking document 306, and a third tracking document 308. In this example, the first tracking document 310 corresponds to an order (e.g., the order 123) of an inbound delivery item 308 the second tracking document 306 corresponds to an order item (e.g., a purchase order item) of the order, and the third tracking document 308 corresponds to the inbound delivery item of the order item. In some embodiments, other tracking documents, such as a fourth, fifth, and so on tracking document, may be created at the first input system 202A. As shown in FIG. 3, the correlation system 105 may receive the first tracking document 310, the second tracking document 306, and the third tracking document 308.

Again referring to FIG. 3, a supplier or logistics provider 330 creates one or more tracking documents via the second input system 202B (e.g., the first client device 120*a*) or directly via the correlation system 105. The second input system 202B may include an externally-facing application programming interface (API) 342 (e.g., a shipment advice API), which may be part of or separate from the correlation system 105. The API 342 may be a secure entry application or microservice. The tracking documents created via the second input system 202B may include a tracking document 324 corresponding to a shipment (e.g., the shipment 125). The shipment 125 may include or otherwise reference the inbound delivery item, the order item, the purchase order, and/or the like. The correlation system 105 may receive, at 324A, the tracking document 324.

As shown in FIG. 3, the first tracking document 310, the second tracking document 306, the third tracking document 308, and the tracking document 324 may be received by the correlation system 105 in any order (e.g., no predetermined order). The correlation system 105 (e.g., the correlation engine 110) may generate a correlation between the first tracking document 310, the second tracking document 306, the third tracking document 308, and/or the tracking document 324. In other words, the correlation system may determine an association between first tracking document 310, the second tracking document 306, the third tracking document 308, and/or the fourth tracking document 324 based at least on a relationship (e.g., a shared correlation feature) between the first tracking document 310, the second tracking document 306, the third tracking document 308, and/or the tracking document 324.

Figure 4:
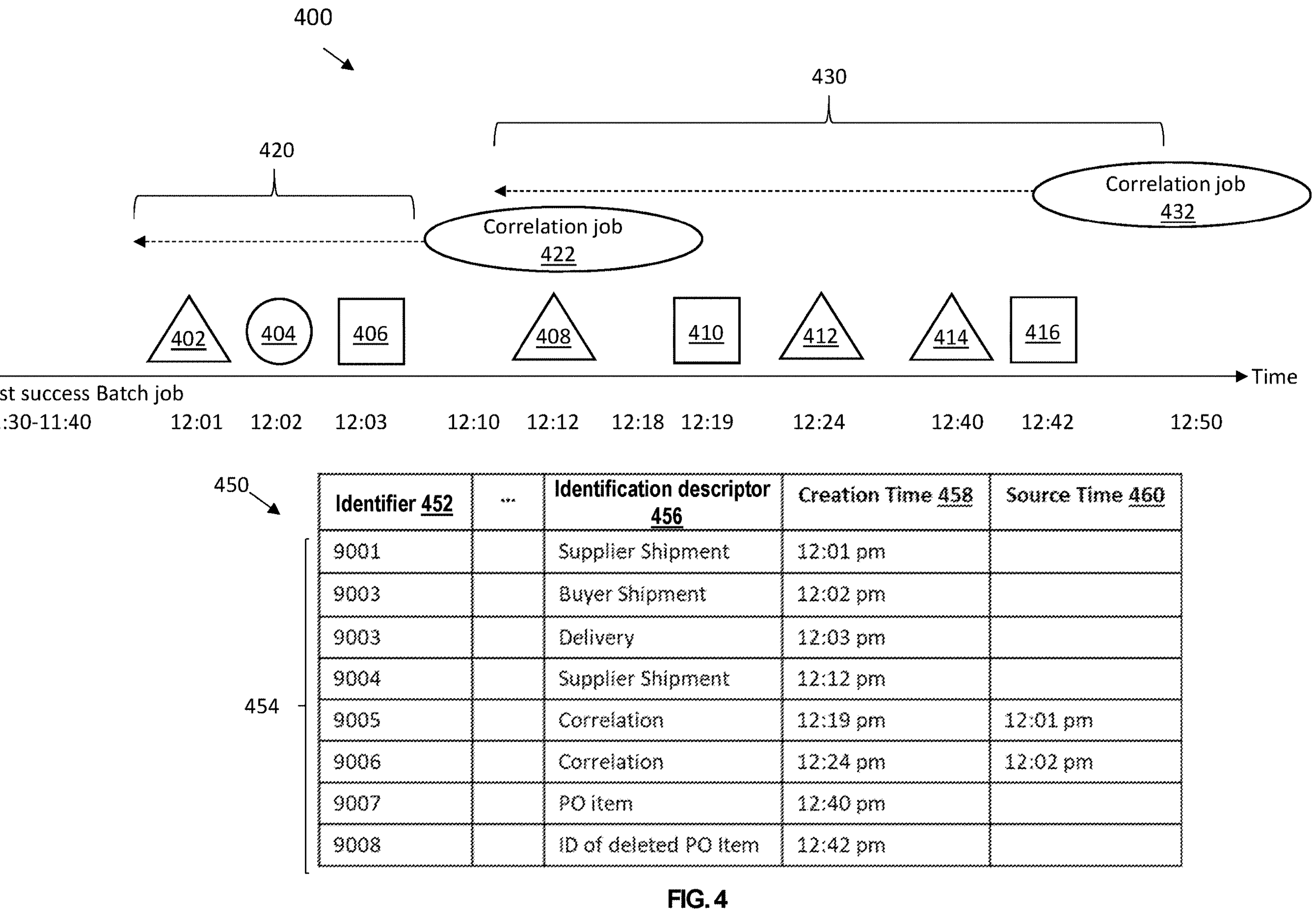
FIG. 4 depicts a block diagram illustrating an example of a correlation and tracker, in accordance with some example embodiments.

FIG. 4 depicts a block diagram illustrating an example of a correlation scenario 400 and tracker 450, in accordance with some example embodiments. As shown in the correlation scenario 400, the tracking documents may be correlated during correlation jobs in one or more batches. The correlation jobs may begin at predetermined intervals (e.g., 5 minutes, 30 minutes, 1 hours, 24 hours, 48 hours, and/or the like), and/or on-demand. Processing the tracking documents in batches allows the correlation engine 110 to account for changes and/or updates to one or more tracking documents, and to eliminate the reliance on the order in which the one or more tracking documents are received by the correlation engine 110.

The batches may include groups of tracking documents received by the correlation system 105 at different times. For example, the correlation system 105 may receive a first batch 420 of tracking documents (including a tracking document 402, a tracking document 404, a tracking document 406, and so on). During correlation job 422, the correlation system 105 may generate a correlation 410 between at least some of the tracking documents of the first batch 420 and/or a correlation 412, also between at least some of the tracking documents of the first batch 420.

The correlation system 105 may also receive a second batch 430 of tracking documents (including a tracking document 408, a tracking document 414, a tracking document 416, and so on) after beginning generation of the first correlation. During a later correlation job 432, the correlation system 105 may generate a second correlation between at least some of the tracking documents of the second batch 430, or between at least one of the tracking documents of the second batch 430 and at least one of the tracking documents of the first batch 420.

In correlation scenario 400, the correlation system 105 (e.g., via the correlation engine 110) receives tracking documents (as part of a first batch) including logistics information associated with a logistics process. For example, at 12:01 pm, the correlation system 105 receives the tracking document 402, which includes logistics information associated with a supplier shipment. At 12:02 pm, the correlation system 105 receives the tracking document 404 including logistics information associated with a buyer shipment. And, at 12:03 pm, the correlation system 105 receives the tracking document 406 including logistics information associated with a delivery.

Based at least on receipt of the tracking documents, for each tracking document, the correlation engine 110 generates and assigns an identifier 452 (e.g., a numeric, alphabetical, or alphanumeric identifier), an identification descriptor 456 identifying a document type of the tracking document, and a creation time 458 indicating when the tracking document was received. The correlation engine 110 may assign the identifier 452 and the identification descriptor 456 based on the logistics information. The correlation engine 110 stores the identifier 452, the identification descriptor 456, and the creation time 458 in the tracker 450, which includes a data table stored in the database 130. The identifier 452, the identification descriptor 456, and the creation time 458 are stored in rows 454 of the tracker 450 that correspond to the tracking documents. The correlation engine 110 may also determine and store a source time 460 in the tracker. The source time 460 includes a time stamp associated with creation of at least one tracking document used to generate the corresponding correlation.

In the example correlation scenario 400, at 12:10 μm, the correlation engine 110 begins a scheduled correlation job 422 to generate a first correlation 410 between at least two of the three tracking documents and a second correlation 412 between at least two of the three tracking documents received prior to beginning the correlation job 422. At 12:24 pm, the correlation engine 110 completes the scheduled correlation job 422. The correlation engine 110 generates the correlation 410 between two or more tracking documents of the first batch 420 based at least on the two or more tracking documents sharing or referencing a common correlation feature. The correlation engine 110 also generates the correlation 412 between two or more tracking documents of the first batch 420 based at least on the two or more tracking documents sharing or referencing a common correlation feature. The generated correlations 410, 412 may be stored in the tracker 450 and/or the database 130. The generated correlations 410, 412 provide an overview of a current state of the associations between the tracking documents tracked by the correlation engine 110, and help to monitor the logistics process.

As an example, the correlation engine 110 may generate the correlation 410 between the tracking document 404, which includes the logistics information associated with the buyer shipment, and the tracking document 406, which includes the logistics information associated with the delivery because the two tracking documents share or reference a common value of an inbound delivery item (the correlation feature in this example). Additionally and/or alternatively, the correlation engine 110 generates the correlation 412 between the tracking document 402, which includes the logistics information associated with the supplier shipment and the tracking document 406, which includes the logistics information associated with the delivery because the two tracking documents share or reference a common value of an order item (the correlation feature in this case). The two generated correlations 410, 412 may be stored in a tracker 450 (e.g., in the database 130) with a creation time (or time stamp) associated with creation of the correlation, a source time (or time stamp) associated with creation of each of the tracking documents used to generate the correlation, and/or other logistics information.

Again referring to the example correlation scenario 400, during execution of the correlation job 422, at 12:12 pm, the correlation system 105 received a tracking document 408 that includes an update or change in the logistics information included in the tracking document 402, which includes logistics information associated with the supplier shipment. For example, the tracking document 408 may include a change in a value (e.g., logistics information) in the tracking document 402 that is indicative of a value indicative of a quantity of an item included in the order, a type of the item included in the order, a buyer of the item, a shipper of the item, a date of the order, a delivery date of the order, a price of the order, and/or the like. Since the change was received after already beginning the correlation job 422, the correlation engine 110 may not incorporate the change during execution of the correlation job 422. Instead, the change is incorporated by the correlation engine 110 during a subsequent correlation job, such as the correlation job 432.

In some example embodiments, the correlation job 432 is performed in the same manner as the correlation job 422. In some example embodiments, during the subsequent correlation job (the correlation job 432), the correlation engine 110 determines the correlation system 105 received the tracking document 408, which includes the change in the logistics information of tracking document 402.

To determine the tracking document 408 includes the change in the logistics information of tracking document 402, the correlation engine 110 accesses the tracker 450. Based at least on the information stored in the tracker 450, the correlation engine 110 determines whether the tracking document 408 and the tracking document 402 include the same document type (e.g., via the identification descriptor 456). Based at least on determining the tracking document 408 and the tracking document 402 are of the same document type, the correlation engine 110 may compare the source time 460 of the correlation generated based on the tracking document 402 from the first batch to the creation time 458 indicating when the tracking document 408 was received.

Based at least on a determination that the two time stamps (e.g., the source time 460 of the correlation 410 and the creation time 458 of the supplier shipment) are different, the correlation engine 110 disregards the originally-generated correlation (correlation 410), since it was generated based on incorrect logistics information, and replaces the correlation with a new correlation. In this example, the new correlation may be generated based on the updated tracking document 408 including the logistics information associated with the supplier shipment created at 12:12 pm, and the tracking document 406 including the logistics information associated with the delivery created at 12:03 pm. The new correlation, generated during the correlation job 432, may be stored in the tracker 450 and/or the database 130. The new correlation may also replace the original incorrect correlation 410 in the tracker 450 by, for example, removing one or more rows in the tracker 450 corresponding to the original incorrect correlation 410.

If the correlation engine 110 determines that the source time 460 (e.g., time stamp) stored with the correlation matches the creation time 458 (e.g., time stamp) of the most recently received tracking document based on which the correlation was generated, the correlation engine 110 does not generate a new correlation during the second correlation job 432. For example, during the subsequent correlation job, the correlation engine 110 may determine that the correlation 412 was generated based on the tracking documents including the logistics information associated with the buyer shipment and the delivery. The correlation engine 110 may then determine that the source time 460 (e.g., 12:02 pm) stored with the generated correlation matches the creation time 458 (e.g., 12:02 pm) of the most recently received tracking document including logistics information associated with the buyer shipment. As a result, the correlation engine 110 determines to not update the generated correlation 412.

FIG. 5 depicts a flowchart illustrating an example of a process 500 for correlating the tracking documents, in accordance with some example embodiments. In some embodiments, the tracking documents may be correlated via the process 500. In other embodiments, at least some of the tracking documents may already be correlated, and the process 500 includes correlating a newly received tracking document with the already correlated tracking documents. The process 500 refers to the tracking document relationship diagrams shown in FIGS. 6A-6E and, in particular, to a first tracking document associated with an order 602, a second tracking document associated with an order item 604 (e.g., the purchase order item) of the order 602, and a third tracking document associated with an inbound delivery item 606 of the order item 604. The process 500 also refers to a fourth tracking document corresponding to the shipment 650, which references the inbound delivery item 606. In this example, the shipment tracking document 650 includes a first shipment 652 and a second shipment 654.

At 502, the correlation engine 110 generates a data structure 601 (see FIGS. 6A-6E) (which may be referred to as a tree or hierarchal structure) based at least on logistics information included in the received tracking documents. The data structure may be hierarchical or tree-like in the sense that tracking documents of a particular document type (e.g., order, order item, inbound delivery item) may refer to other tracking documents of another document type, and so on. In the example of FIGS. 6A-6E, the data structure 601 includes at least a subset of the tracking documents received by the correlation system 105. The hierarchal structure 601 depicts the relationships among tracking documents.

For example, the structure 601 includes the first tracking document corresponding to the order 602, the second tracking document corresponding to the order item 604, and the third tracking document corresponding to the inbound delivery item 606. The structure 601 includes a plurality of nodes. The plurality of nodes include one or more root nodes 608, 610, 612, one or more child nodes 614, 616, 618, 620, 622, and one or more leaf nodes 624, 626, 628, 630, 632. The structure 601 depicts the relationship between each of the one or more root nodes 608, 610, 612, the one or more child nodes 614, 616, 618, 620, 622, and the one or more leaf nodes 624, 626, 628, 630, 632.

Figure 6A:
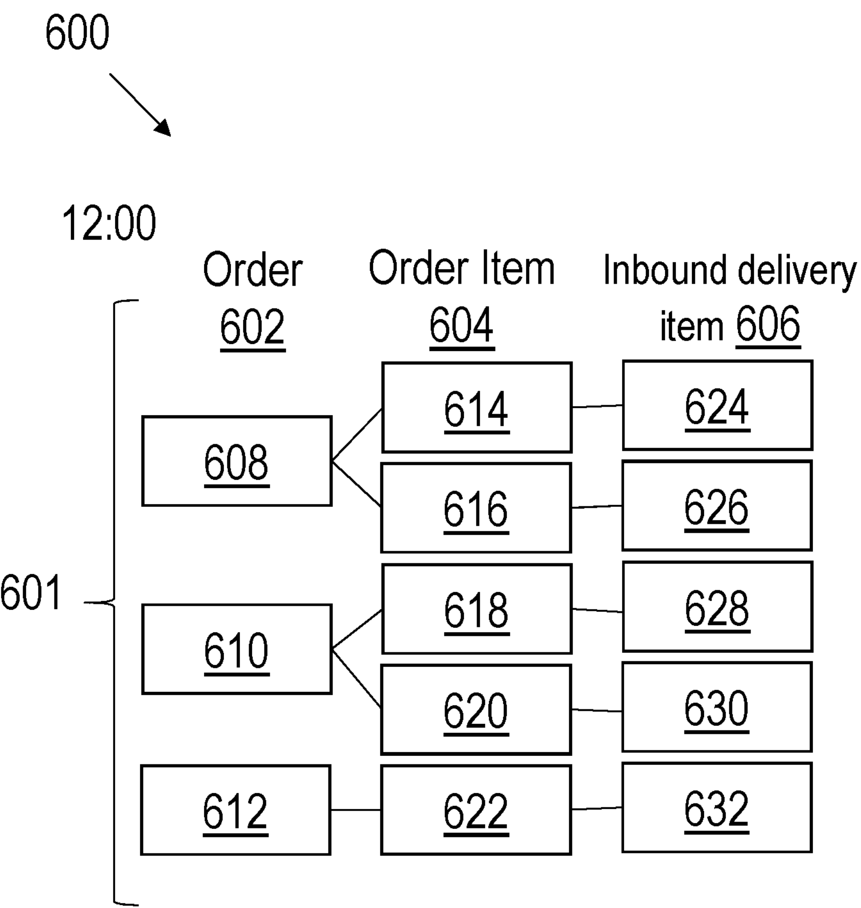
FIG. 6A depicts a diagram illustrating a tracking document relationship, in accordance with some example embodiments.

FIG. 6A depicts a diagram illustrating relationships among tracking documents ("tracking document relationship") 600, which is an example of the hierarchical structure 601. This example hierarchical structure 601 is referred to in FIGS. 5 and 6A-6E. As shown in the hierarchical structure 601, the one or more root nodes 608, 610, 612 are each associated with the order 602 (e.g., a same or different order), the one or more child nodes 614, 616, 618, 620, 622 are each associated with the order item 604 (e.g., a same or different order item), and the one or more leaf nodes 624, 626, 628, 630, 632 are each associated with the inbound delivery item 606 (e.g., a same or different inbound delivery item).

As shown in the tracking document relation 600 of FIG. 6A, the inbound delivery item (which is represented in the structure 601 by the leaf node 624) is associated with the order item (which is represented by the child node 614), while the inbound delivery item corresponding to the leaf node 626 is associated with the order item corresponding to the child node 616. Both the order item corresponding to the child node 614 and the order item corresponding to the child node 616 are associated with the root node 608, and so on. Thus, referring to the hierarchical structure 601, the inbound delivery item corresponding to the leaf node 624, the order item corresponding to the child node 614, and the order corresponding to the root node 608 are correlated, the inbound delivery item corresponding to the leaf node 626, the order item corresponding to the child node 616, and the order corresponding to the root node 608 are correlated, and so on. Accordingly, the hierarchical structure 601 shows the relationships (e.g., associations) between each associated inbound delivery item 606, order item 604, and order 602.

In some embodiments, the associations (e.g., links between nodes corresponding to the orders 602, order items 604, and inbound delivery items 606) depicted in the structure 601 may not yet be known by the correlation engine 110. Instead, in some embodiments the hierarchical structure 601, including the depicted associations, may be determined by the correlation engine 110 by accessing the logistics information included in the corresponding tracking documents. The determined associations or correlations among the tracking documents may be stored in the database 130, as described herein.

In FIG. 5 at 504, the correlation system 105 may receive at least one tracking document, such as the tracking document associated with the first shipment 652. Based on receiving the at least one tracking document, the correlation engine 110 correlates the received document with the tracking documents in the structure 601. For example, the correlation engine 110 determines the tracking documents in the structure 601 that are related to the received tracking document. FIG. 6B depicts a tracking document relationship 640 that shows a state of the tracking document relationship 600 at time 12:15. As shown in the tracking document relationship 640, the correlation engine 110 has, at time 12:15, received the tracking document associated with the first shipment 652.

The tracking document associated with the received first shipment 652 may indicate an association with a related set of tracking documents, such as the order item represented as the child node 616, the order item represented as the child node 620, and/or the order item represented as the child node 622. In other words, the tracking document may include a correlation feature, such as any value (e.g., a numerical quantity or other value) included in the tracking documents that can be used to correlate the tracking documents. In this example, the correlation feature may be the order item 604. Thus, the tracking document associated with the shipment 652 may include values associated with the order item 604 (e.g., shown as the child nodes 616, 620, 622). While in this example, the correlation feature is the value of the order items 604, the correlation feature may additionally and/or alternatively include a value of the inbound delivery item 606, the purchase order 602, and/or the like. The correlation engine 110 uses the correlation feature to correlate the shipment 652 to the tracking documents of the structure 601.

In FIG. 5 at 506, the correlation engine 110 locates root nodes (e.g., all root nodes) associated with the tracking documents referenced by the correlation features (e.g., shown as child nodes 616, 620, 622). Additionally and/or alternatively, at 508, the correlation engine 110 locates child nodes (e.g., all child nodes) associated with the tracking documents referenced by the correlation features. In other words, the correlation engine 110 locates root nodes associated with the at least one node (corresponding to the tracking documents in the structure 601 having the correlation feature) and all leaf nodes associated with the at least one node by at least recursively searching the structure 601. This helps to build the relationships between the plurality of nodes (e.g., all of the nodes in the hierarchical structure 601) and the first shipment 652.

As an example, FIG. 6C depicts a diagram illustrating a tracking document relationship 660, in accordance with some example embodiments. The tracking document relationship 660 shows a state of the tracking document relationship 640 at time 12:30, such as after the state of the tracking document relationship 600 shown in FIG. 6B. As shown in the tracking document relationship 660, the correlation engine 110 has, at time 12:30, begun a first correlation job to correlate the shipment 652 with the one or more tracking documents of the hierarchical structure 601, such as the inbound delivery items 606. The correlation engine 110 correlates the shipment 652 to the one or more tracking documents of the hierarchical structure 601, based at least on the known association (e.g., based on the shared correlation feature) between the shipment 652 and the order item 604 corresponding to child nodes 616, 620, 622.

Referring to FIG. 6C, during execution of the first correlation job, the correlation engine 110 locates all root nodes associated with the order items 604 corresponding to the child nodes 616, 620, 622, which as noted above, were referenced by the received first shipment 652. In this example, the correlation engine 110 locates all root nodes 608, 610, 612 of the child nodes 616, 620, 622 referenced by the first shipment 652 (e.g., step 504), and locates all leaf nodes 626, 630, 632 (e.g., step 506) of the child nodes 616, 620, 622 by at least recursively searching the hierarchical structure 601. This allows the correlation engine 110 to generate a first correlation between the tracking document associated with the shipment 652 and at least some of the tracking documents of the structure 601. As a result, in this example, the determined first correlation includes the relationship between at least the first shipment 652 and the inbound delivery items corresponding to the leaf nodes 626, 630, 632.

FIG. 6D depicts a diagram illustrating a tracking document relationship 670, in accordance with some example embodiments. The tracking document relationship 670 shows a state of the tracking document relationship 600 at time 12:45, such as after the state of the tracking document relationship 660 shown in FIG. 6C. As shown in the tracking document relationship 670, the correlation engine 110 has, at time 12:45, received the tracking document associated with the second shipment 654. The received second shipment 654 may indicate or reference an association (e.g., via the shared correlation feature) with tracking documents of the structure 601. In this example, the values of the correlation feature may include the order item at node 614 and the order item at node 618.

FIG. 6E depicts a diagram illustrating a tracking document relationship 680, in accordance with some example embodiments. The tracking document relationship 680 shows a state of the tracking document relationship 600 at time 13:00, such as after the state of the tracking document relationship 670 shown in FIG. 6D. The correlation engine 110 locates all root nodes associated with the at least one node (corresponding to the correlated order item tracking documents at nodes 614 and 618) and all leaf nodes associated with the at least one node by at least recursively searching the structure 601. This helps to build the relationships between the plurality of nodes (e.g., at least some of the nodes in the hierarchical structure 601) and the second shipment 654.

For example, as shown in the tracking document relationship 680, the correlation engine 110 has, at time 13:00, begun a second correlation job to correlate the shipment 654 with the one or more tracking documents of the hierarchical structure 601, such as the inbound delivery items 606. The correlation engine 110 correlates the shipment 654 to the one or more tracking documents of the hierarchical structure 601, based at least on the known association (e.g., based on the shared correlation feature) between the shipment 654 and the order item 604 corresponding to child nodes 614, 618. In this example, the correlation engine 110 locates the root node 608 associated with the child node 614 and the root node 610 associated with the child node 618. The correlation engine 110 also locates the leaf node 624 associated with the child node 614 and the leaf node 628 associated with the child node 618 by at least recursively searching the hierarchical structure 601. As a result, the correlation engine 110 can associate the second shipment 654 to the inbound delivery items corresponding to leaf nodes 624, 628 and/or the root nodes 608, 610 associated with the order items corresponding to the child nodes 614, 618, respectively. This allows the correlation engine 110 to generate a second correlation that includes the relationship between the second shipment 654 and the inbound delivery items included in the second shipment 654 represented as the leaf nodes 624, 628.

In FIG. 5, at 510, the correlation engine 110 determines, based on recursively searching the hierarchical structure 601, whether any other tracking documents (e.g., order items) corresponding to any one of the shipments 650 (e.g., the first shipment 652 and/or the second shipment 654) are found. In other words, the correlation engine 110 determines whether another received tracking document (e.g., the first shipment 652) is associated with the hierarchical structure 601. This allows for the correlation engine 110 to capture, in the second correlation, all shipments 650, including the first shipment 652 and the second shipment 654, and all correlations between the first shipment 652 and the second shipment 654 and the inbound delivery items (represented as the leaf nodes). For example, by recursively searching the hierarchical structure 601, the correlation engine 110 may determine the existence of the first shipment 652 and trace the association between the first shipment 652 and the associated inbound delivery items corresponding to the leaf nodes 626, 630, 632 back to the root nodes, including all of the root nodes 608, 610, 612. After generating the second correlation, the correlation engine 110 determines that no other tracking documents are found, thereby completing the second correlation job.

FIG. 7 depicts a flowchart illustrating an example of a process 700 for correlating tracking documents to generate a correlation between the tracking documents, in accordance with some example embodiments. The process 700 may be performed by the correlation engine 110 and/or the correlation system 105. The correlation engine 110 may correlate the tracking documents based on a correlation feature. The correlation feature, as described herein, may define the relationship between two or more tracking documents. The correlation feature can be a value (e.g., a numeric, alphanumeric, and/or alphabetical value) found in at least two of the tracking documents, or found in a document referenced by at least two of the tracking documents.

Figure 8:
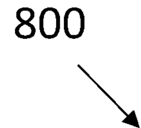
FIG. 8 depicts an example of a correlation of tracking documents, in accordance with some example embodiments.

The process 700 may refer to the example of a correlation scenario 800 shown in FIG. 8. The process 700 also refers to a tracking document including logistics information associated with an order item 808 of an order and an inbound delivery item 806 of the order item, and a tracking document including logistics information associated with a shipment 810 of the order and order item 808 of the order.

At 702, the correlation engine 110 may determine a value of a correlation feature of a first set of tracking documents. The first set of tracking documents may include tracking documents including logistics information associated with an order item 808 of an order and an inbound delivery item 806 of the order item. These tracking documents may include a reference (e.g., correlation feature). The correlation feature in this example may be the value of the order items 808. The correlation feature may be pre-defined, such as at the time of creation of the tracking document, and/or derived based on the tracking documents. While the value of the order item is used in this example as the correlation feature, other correlation features corresponding to different tracking documents may be used by the correlation engine 110 to correlate two or more tracking documents.

FIG. 8 illustrates a table 802 (e.g., generated by the correlation engine 110) including two columns. A first column includes values of each of the inbound delivery items 806 (e.g., from the associated tracking documents) and a second column includes values of the order items 808 (e.g., from the associated tracking documents) associated with each of the inbound delivery items 806. Referring to the table 802, the order item values 01, 02, and 03 are associated with inbound delivery item 1001; order item value 04 is associated with the inbound delivery item 1002; and order item value 05 is associated with the inbound delivery item 1003.

Referring back to FIG. 7, at 704, the correlation engine 110 may determine a value of a correlation feature of a second set of tracking documents. The second set of tracking documents may include tracking documents including logistics information associated with a shipment 810 and the order item 808. These tracking documents may include a reference (e.g., correlation feature). Again, the correlation feature in this example may be the value of the order item 808.

Referring back to FIG. 8, FIG. 8 illustrates a table 804 (e.g., generated by the correlation engine 110) including two columns. A first column includes values of each of the shipments 810 (e.g., from the associated tracking documents) and a second column of the table 804 includes the values of the order items 808 (e.g., from the associated tracking documents) associated with each of the shipments 810. Referring to the table 804, the order item values 01, 02, and 03 are associated with shipment 2001; order item values 01, 04 are associated with the shipment 2002; and order item value 06 is associated with the shipment 2003.

Referring back to FIG. 7, at 706, the correlation engine 110 compares the first set of tracking documents and the second tracking documents based on the correlation feature. As noted, the correlation feature (e.g., the order item) is shared between the first set of tracking documents and the second set of tracking documents. Referring to the example shown in FIG. 8, the correlation engine 110 compares the inbound delivery items and the shipments based at least on the associated order items. For example, the correlation engine 110 compares the values of the order items associated with the inbound delivery items with the values of the order items associated with the shipments to determine whether any of the values of the order items associated with the inbound delivery items matches the values of the order items associated with the shipments.

At 708, the correlation engine 110 determines a correlation between a first tracking document of the first set of tracking documents and a second tracking document of the second set of tracking documents based at least on the comparison of associated correlation features. In this way, the correlation engine 110 may determine correlation pairs (e.g., correlated tracking documents) defined by a first tracking document and a second tracking document having a matching correlation feature.

Referring to FIG. 8, the correlation engine 110 may generate a joined table 820 based on the comparison of associated correlation features included in the table 802 and the table 804. For example, the joined table 820 may be a join of the table 802 and the table 804 based on the correlation features. The joined table 820 thus includes the correlation pairs. The joined table 820 may be generated by joining the tracking documents including the inbound delivery items 806 from the table 802 and the tracking documents including the shipments 810 from the table 804 having matching correlation features (e.g., the order items 808).

For example, as shown in the table 820, a first correlation pair includes the inbound delivery item 1001 and shipments 2001, 2002. To identify the first correlation pair as including the inbound delivery item 1001 and the shipments 2001, 2002, the correlation engine 110 at least accesses the table 802 and the table 804. The correlation engine 110 determines the first correlation pair includes the delivery item 1001 and the shipments 2001, 2002 at least because the order items (01, 02, 03) associated with inbound delivery item 1001 (see table 802) and the order items (01, 02, 03) associated with the shipment 2001 (see table 804) at least partially overlap. In other words, at least one value of the order items corresponding to the inbound delivery item 1001 matches at least one value of the order items corresponding to the shipment 2001. For example, both the inbound delivery item 1001 and the shipment 2001 were associated with a correlation feature (e.g., order item) having a value of 01, 02, and/or 03. Also, both the inbound delivery item 1001 and the shipment 2002 were associated with a correlation feature (e.g., order item) having a value of 01. Thus, at least one value of the correlation feature associated with both the inbound delivery item 806 and shipment 808 matched.

Accordingly, the correlation engine 110 may generate the correlation (e.g., the first correlation, the second correlation, etc.) between at least two tracking documents of the one or more interconnected tracking documents based at least on matching correlation features of at least two tracking documents.

Figure 9:
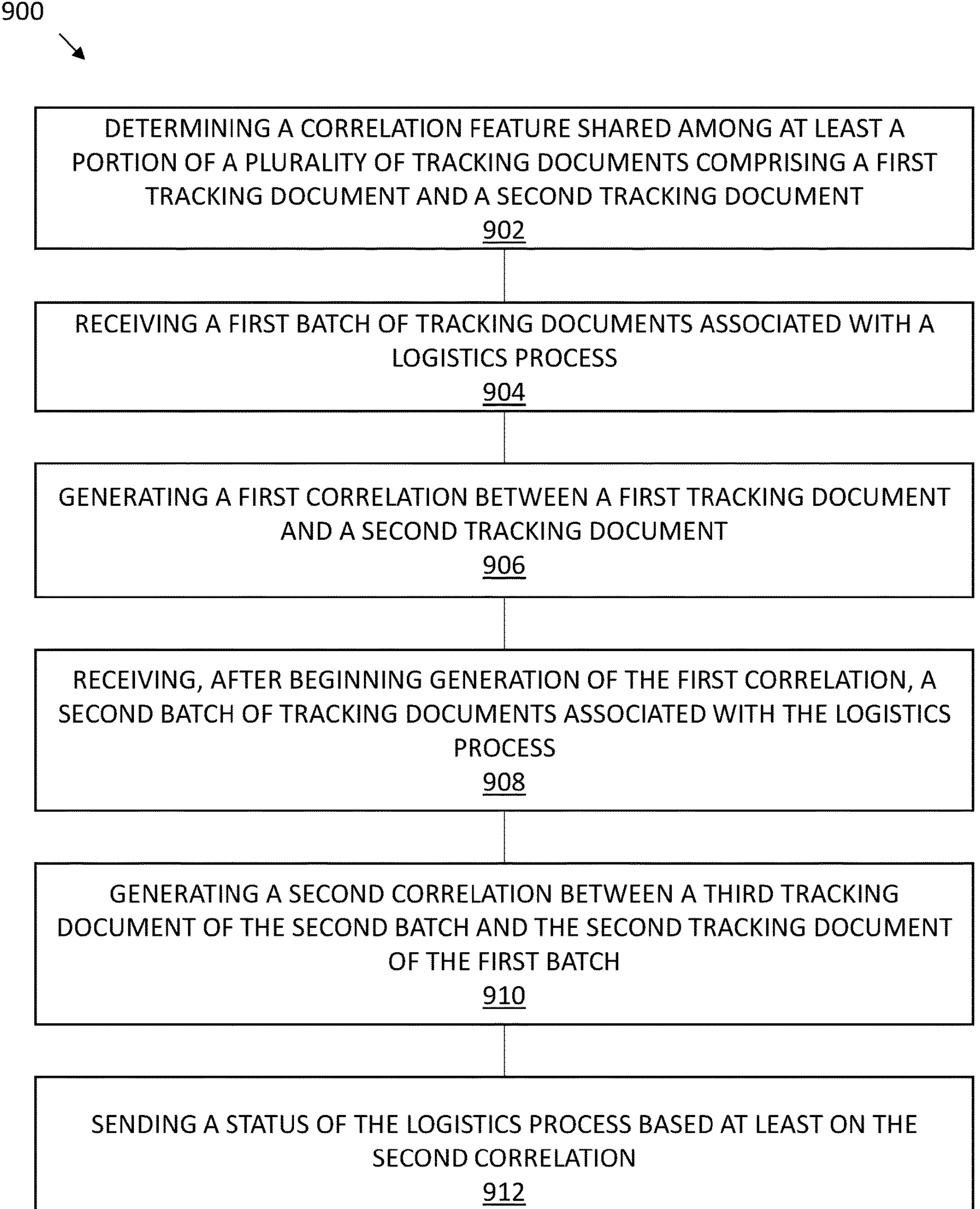
FIG. 9 depicts a flowchart illustrating an example of a correlation process, in accordance with some example embodiments.

FIG. 9 depicts a flowchart illustrating an example of a correlation process 900 for a stream based framework for associating logistics documents using correlation features, in accordance with some example embodiments. Referring to FIGS. 1-9, the process 900 may be performed by the correlation system 105 (e.g., the correlation engine 110) and/or another component of the enterprise software system 100.

At 902, the correlation system 105 (e.g., the correlation engine 110) may determine a correlation feature shared among at least a portion of a plurality of tracking documents. The correlation feature may be determined based on content derived from the plurality of tracking documents. Additionally and/or alternatively, the correlation feature may be determined based on an indication (e.g., an entry) received via a user interface. The received indication may be used as the correlation feature.

The correlation feature may include an identifier (e.g., a numeric, an alphanumeric, an alphabetical, or the like, identifier) that is shared among at least a portion of the tracking documents to enable generation of a correlation (e.g., a first correlation, a second correlation, and/or the like), such as a correlation between two or more tracking documents. The correlation feature may be any value linked to or found in the documents. For example, the correlation feature may include a value associated with at least one of an order, an order item included in the order, an inbound delivery item included in the order, a shipment of the order, and/or the like. The value may identify the order, the order item, the inbound delivery item, the shipment, and/or the like.

The plurality of tracking documents include a first tracking document, a second tracking document, and/or the like.

The first tracking document may include the order, an order item included in the order, an inbound delivery item corresponding to the order item, and/or shipment of the order including the inbound delivery item. The second tracking document may include a different one of the order, the order item included in the order, the inbound delivery item corresponding to the order item, and/or shipment of the order including the inbound delivery item, and so on. In some embodiments, the first tracking document is associated with the order and the second tracking document is associated with the shipment of the order. Other combinations of document types are contemplated herein.

At 904, the correlation system 105 (e.g., the correlation engine 110) may receive a first batch of tracking documents associated with a logistics process. The first batch of tracking documents may include the first tracking document and/or the second tracking document of the plurality of tracking documents. The logistics process may be tracked by the plurality of tracking documents. The logistics process may include one or more events associated with placing an order, shipping the order, and/or receiving the order. The correlation engine 110 may receive the tracking documents from one or more streams (e.g., input systems), such as a first enterprise software application (e.g., a purchaser), a second enterprise software application (e.g., a supplier or shipper), and/or the like.

As noted, the tracking documents may include the correlation feature and logistics information associated with the logistics process. The logistics information may include one or more values associated with the logistics process. The logistics information may be indicative of various aspects of an order, an order item, an inbound delivery item, a shipment, and/or the like. For example, the one or more values may include a quantity of an item included in the order, a type of the item included in the order, a buyer of the item, a shipper of the item, a date of the order, a delivery date of the order, and/or a price of the order.

In some embodiments, at least a subset of the tracking documents may be configured into (or forms) a hierarchical structure (e.g., see FIGS. 6A-6E). The correlation system 105 may generate the hierarchical structure based at least on the subset of the tracking documents. The hierarchical structure may include a plurality of nodes corresponding to the subset of the tracking documents. In some embodiments, the subset of the tracking documents forming the hierarchical structure includes at least the first tracking document, and so on.

In some embodiments, a received tracking document, such as the second tracking document, is not included in the subset that forms the hierarchical structure. The second tracking document may include a reference (e.g., a second reference) to at least one of the tracking documents of the subset corresponding to at least one node of the plurality of nodes forming the hierarchical structure. For example, the second tracking document may include a reference (e.g., the second reference) to the first tracking document of the subset. The first tracking document may correspond to at least one node of the plurality of nodes.

At 906, the correlation system 105 (e.g., the correlation engine 110) may generate a first correlation between the first tracking document and the second tracking document based at least on the correlation feature. The first correlation may include a link between the first tracking document and the second tracking document. The link between the first tracking document and the second tracking document may include a mapping between the logistics information of the first tracking document and the second tracking document. This allows for tracking of the logistics process.

In some embodiments, the correlation system 105 determines each of the first tracking document and the second tracking document contains the correlation feature (e.g., value) or references another tracking document of the first batch of tracking documents that includes the correlation feature (e.g., value). The first correlation between the first tracking document and the second tracking document may be stored to enable monitoring of the logistics process.

In some embodiments, the correlation system 105 references the hierarchical structure when generating the first correlation. For example, the correlation system 105 may locate root nodes (e.g., all root nodes) and leaf nodes (e.g., all leaf nodes) associated with the at least one node corresponding to the first tracking document, which as noted above, may be referenced by the second tracking document. The correlation system 105 may locate root nodes associated with the at least one node and leaf nodes associated with the at least one node by at least recursively searching the hierarchical structure to determine whether another tracking document is correlated with the first tracking document.

At 908, the correlation system 105 (e.g., the correlation engine 110) receives a second batch of tracking documents associated with the logistics process. The correlation system 105 may receive the second batch of tracking documents after beginning generation of the first correlation. In other words, the second batch of tracking documents includes tracking documents that are received by the correlation system 105 after generation of the first correlation begins.

In some embodiments, the second batch of tracking documents includes a third tracking document. In some embodiments, the second batch of tracking documents includes one or more additional tracking documents, similar to the first batch of tracking documents. The third tracking document and the first tracking document may include a same document type. In some embodiments, the additional tracking documents includes other document types. Each document type may be associated with an order, an order item included in the order, an inbound delivery item included in the order, a shipment of the order, and/or the like.

The third tracking document may include a change in the logistics information of the first tracking document of the first batch. For example, the third tracking document may include a change in a value in the first tracking document that is indicative of a value indicative of a quantity of an item included in the order, a type of the item included in the order, a buyer of the item, a shipper of the item, a date of the order, a delivery date of the order, a price of the order, and/or the like. This may occur when there is an error in the logistics information of the first tracking document. In this example, the change included in the third tracking document is a correction of the error in the first tracking document. Also in this example, the change was made after beginning generation of the first correlation. Thus, the change was captured as part of the second batch, in the third tracking document.

At 910, the correlation system 105 (e.g., the correlation engine 110) may generate a second correlation between the third tracking document of the second batch and the second tracking document of the first batch, based at least on the correlation feature and the change. The second correlation may include a link between the third tracking document and the second tracking document. The link between the third tracking document and the second tracking document may include a mapping between the logistics information of the third tracking document and the second tracking document.

This allows for tracking of the logistics process, including tracking of the change in the logistics information.

In some embodiments, the correlation system 105 determines each of the third tracking document and the second tracking document includes the correlation feature (e.g., value) or references another tracking document of the second batch of tracking documents that includes the correlation feature (e.g., value). The second correlation between the third tracking document and the first tracking document may be stored to enable monitoring of the logistics process, and to correct or otherwise update the first correlation.

The second correlation may additionally and/or alternatively be generated between two or more other tracking documents of the second batch of tracking documents. For example, the correlation system 105 may determine two or more other tracking documents includes the correlation feature (e.g., value) or references another tracking document of the second batch of tracking documents that includes the correlation feature (e.g., value).

In some embodiments, the correlation system 105 references the hierarchical structure when generating the second correlation. For example, the correlation system 105 may locate root nodes (e.g., all root nodes) and leaf nodes (e.g., all leaf nodes) associated with the at least one node corresponding to at least one of the tracking documents being correlated. The correlation system 105 may locate root nodes associated with the at least one node and leaf nodes associated with the at least one node by at least recursively searching the hierarchical structure to determine whether another tracking document is correlated with the tracking document being correlated.

As noted herein, the first tracking document may include a first document type. The first correlation may also be assigned a source time indicating when the first tracking document is received (e.g., by the correlation system 105). The correlation system 105 (e.g., the correlation engine 110) may determine whether the source time matches a creation time indicating when the third tracking document was received. The correlation system 105 (e.g., the correlation engine 110) may additionally and/or alternatively determine whether the third tracking document is of the first document type.

Based on a determination that the source time does not match the creation time, the correlation system 105 (e.g., the correlation engine 110) may update the first correlation to generate the second correlation. In other words, the correlation system 105 (e.g., the correlation engine 110) determining that the first tracking document and the third tracking document both includes the first document type, and determining the source time fails to match the creation time indicates that the third tracking document includes a change in the logistics information indicated by the first tracking document. As a result, the correlation system 105 (e.g., the correlation engine 110) updates the first correlation to generate the second correlation to include the change. The correlation system 105 (e.g., the correlation engine 110) may store the second correlation to enable monitoring of the logistics process.

At 912, the correlation system 105 (e.g., the correlation engine 110) may send a status of the logistics process, based at least on the second correlation. The status may indicate at least the change, such as the change in the logistics information indicated by the first tracking document of the first batch. The correlation system 105 may send the status via the client device 120*a* (e.g., the first stream) and/or the client device 120*b* (e.g., the second stream). In some embodiments, the correlation system 105 sends the status based on the stored second correlation and/or the first correlation. Accordingly, the correlation system 105 efficiently tracks the logistics process.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one processor; and at least one memory including program code which when executed by the at least one processor provides operations comprising: determining a correlation feature shared among at least a portion of a plurality of tracking documents comprising a first tracking document and a second tracking document; receiving a first batch of tracking documents associated with a logistics process, wherein the tracking documents comprise the correlation feature and logistics information associated with the logistics process, and wherein the first batch of tracking documents comprises the first tracking document and the second tracking document; generating, based at least on the correlation feature, a first correlation between the first tracking document and the second tracking document; receiving, after beginning generation of the first correlation, a second batch of tracking documents associated with the logistics process, wherein the second batch of tracking documents comprises a third tracking document comprising a change in the logistics information indicated by the first tracking document of the first batch; generating, based at least on the correlation feature and the change, a second correlation between the third tracking document of the second batch and the second tracking document of the first batch; and sending, based at least on the second correlation, a status of the logistics process, the status indicating at least the change.

Example 2: The system of example 1, wherein the logistics process is tracked by the plurality of tracking documents, and wherein the logistics process comprises one or more events associated with placing an order, shipping the order, and/or receiving the order.

Example 3: The system of any one of examples 1 to 2, wherein the logistics information comprises a value indicative of a quantity of an item included in the order, a type of the item included in the order, a buyer of the item, a shipper of the item, a date of the order, a delivery date of the order, and/or a price of the order.

Example 4: The system of any one of examples 1 to 3, wherein the first tracking document comprises the order, an order item included in the order, an inbound delivery item for the order item, and/or shipment of the order including the inbound delivery item.

Example 5: The system of any one of examples 1 to 4, wherein the correlation feature comprises an identifier shared among at least the portion of the tracking documents to enable the first correlation and the second correlation.

Example 6: The system of any one of examples 1 to 5, wherein the determining of the correlation feature further comprises determining the correlation feature based on content derived from the plurality of tracking documents and/or based on an indication received via a user interface, wherein the received indication is used as the correlation feature.

Example 7: The system of any one of examples 1 to 6, wherein the correlation feature comprises a value indicative of an order, an order item included in the order, an inbound delivery item included in the order, and/or a shipment of the order.

Example 8: The system of any one of examples 1 to 7, wherein generating the first correlation comprises: determining each of the first tracking document and the second tracking document contains the value or references another tracking document of the first batch of tracking documents that includes the value; and storing the first correlation between the first tracking document and the second tracking document to enable tracking of the logistics process.

Example 9: The system of any one of examples 1 to 8, wherein a subset of the tracking documents forms a hierarchical structure including a plurality of nodes corresponding to the subset of the tracking documents, and wherein the subset of the tracking documents comprises the first tracking document.

Example 10: The system of any one of examples 1 to 9, wherein the second tracking document is not included in the subset, wherein the second tracking document comprises a second reference to the first tracking document of the subset, and wherein generating the first correlation comprises locating root nodes associated with at least one node corresponding to the first tracking document and leaf nodes associated with the at least one node by at least recursively searching the hierarchical structure to determine whether another tracking document is correlated with the first tracking document.

Example 11: The system of any one of examples 1 to 10, wherein the first correlation is assigned a source time indicating when the first tracking document is received, and wherein the operations further comprise: determining whether the source time matches a creation time indicating when the third tracking document was received; updating, based on a determination that the source time does not match the creation time, the first correlation to generate the second correlation; and storing the second correlation.

Example 12: A computer-implemented method, comprising: determining a correlation feature shared among at least a portion of a plurality of tracking documents comprising a first tracking document and a second tracking document; receiving a first batch of tracking documents associated with a logistics process, wherein the tracking documents comprise the correlation feature and logistics information associated with the logistics process, and wherein the first batch of tracking documents comprises the first tracking document and the second tracking document; generating, based at least on the correlation feature, a first correlation between the first tracking document and the second tracking document; receiving, after beginning generation of the first correlation, a second batch of tracking documents associated with the logistics process, wherein the second batch of tracking documents comprises a third tracking document comprising a change in the logistics information indicated by the first tracking document of the first batch; generating, based at least on the correlation feature and the change, a second correlation between the third tracking document of the second batch and the second tracking document of the first batch; and sending, based at least on the second correlation, a status of the logistics process, the status indicating at least the change.

Example 13: The method of example 12, wherein the logistics process is tracked by the plurality of tracking documents, and wherein the logistics process comprises one or more events associated with placing an order, shipping the order, and/or receiving the order.

Example 14: The method of any one of examples 12 to 13, wherein the logistics information comprises a value indicative of a quantity of an order item included in the order, a type of the order item included in the order, a buyer of the order item, a shipper of the order item, a date of the order, a delivery date of the order, and/or a price of the order, and wherein the first tracking document comprises the order, the order item included in the order, an inbound delivery item corresponding to the order item, and/or shipment of the order including the inbound delivery item.

Example 15: The method of any one of examples 12 to 14, wherein the correlation feature comprises an identifier shared among at least the portion of the tracking documents to enable the first correlation and the second correlation, wherein the determining of the correlation feature further comprises determining the correlation feature based on content derived from the plurality of tracking documents and/or based on an indication received via a user interface, wherein the received indication is used as the correlation feature, and wherein the correlation feature comprises a value indicative of an order, an order item included in the order, an inbound delivery item included in the order, and/or shipment of the order.

Example 16: The method of any one of examples 12 to 15, wherein generating the first correlation comprises: determining each of the first tracking document and the second tracking document contains the value or references another tracking document of the first batch of tracking documents that includes the value; and storing the first correlation between the first tracking document and the second tracking document to enable tracking of the logistics process.

Example 17: The method of any one of examples 12 to 16, wherein a subset of the tracking documents forms a hierarchical structure including a plurality of nodes corresponding to the subset of the tracking documents, and wherein the subset of the tracking documents comprises the first tracking document.

Example 18: The method of any one of examples 12 to 17, wherein the second tracking document is not included in the subset, wherein the second tracking document is associated with a shipment of an order and the first tracking document of the subset is associated with the order, wherein the second tracking document comprises a second reference to the first tracking document of the subset corresponding to at least one node of the plurality of nodes, and wherein generating the first correlation comprises locating root nodes associated with the at least one node and leaf nodes associated with the at least one node by at least recursively searching the hierarchical structure to determine whether another tracking document is correlated with the first tracking document.

Example 19: The method of any one of examples 12 to 18, wherein the first correlation is assigned a source time indicating when the first tracking document is received, and wherein the method further comprises: determining whether the source time matches a creation time indicating when the third tracking document was received; updating, based on a determination that the source time does not match the creation time, the first correlation to generate the second correlation; and storing the second correlation.

Example 20: A non-transitory computer readable medium storing instructions, which when executed by at least one data processor, result in operations comprising: determining a correlation feature shared among at least a portion of a plurality of tracking documents comprising a first tracking document and a second tracking document; receiving a first batch of tracking documents associated with a logistics process, wherein the tracking documents comprise the correlation feature and logistics information associated with the logistics process, and wherein the first batch of tracking documents comprises the first tracking document and the second tracking document; generating, based at least on the correlation feature, a first correlation between the first tracking document and the second tracking document; receiving, after beginning generation of the first correlation, a second batch of tracking documents associated with the logistics process, wherein the second batch of tracking documents comprises a third tracking document comprising a change in the logistics information indicated by the first tracking document of the first batch; generating, based at least on the correlation feature and the change, a second correlation between the third tracking document of the second batch and the second tracking document of the first batch; and sending, based at least on the second correlation, a status of the logistics process, the status indicating at least the change.

Figure 10:
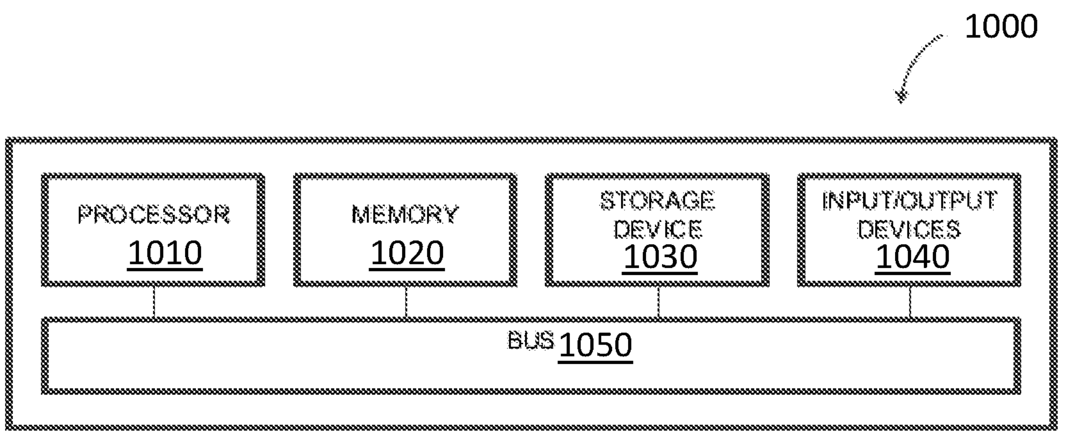
FIG. 10 depicts a block diagram illustrating an example of a computing system, in accordance with some example embodiments; and When practical, similar reference numbers denote similar structures, features, or elements.

FIG. 10 depicts a block diagram illustrating a computing system 1000, in accordance with some example embodiments. Referring to FIGS. 1-10, the computing system 1000 can be used to implement the correlation system 105 (e.g., the correlation engine 110), the enterprise software system 100, and/or any components therein.

As shown in FIG. 10, the computing system 1000 can include a processor 1010, a memory 1020, a storage device 1030, and an input/output device 1040. The processor 1010, the memory 1020, the storage device 1030, and the input/output device 1040 can be interconnected via a system bus 1050. The processor 1010 is capable of processing instructions for execution within the computing system 1000. Such executed instructions can implement one or more components of, for example, the correlation system 105 (e.g., the correlation engine 110). In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration document databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other documents, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or document-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one processor, and at least one memory including program code which when executed by the at least one processor provides operations comprising:

determining a correlation feature shared among at least a portion of a plurality of tracking documents comprising a first tracking document and a second tracking document, wherein a subset of the tracking documents including the first tracking document forms a hierarchical data structure including a plurality of nodes corresponding to the subset of the tracking documents and a plurality of links that correlate one of the plurality of nodes with another one of the plurality of nodes, and wherein the second tracking document includes a reference to the first tracking document but is excluded from the subset;

receiving a first batch of tracking documents associated with a logistics process, wherein the tracking documents comprise the correlation feature and logistics information associated with the logistics process, wherein the first batch of tracking documents comprises the first tracking document and the second tracking document;

generating, based at least on the correlation feature, a first correlation between the first tracking document and the second tracking document by adding one or more first links to the hierarchical data structure correlating at least one node corresponding to the first tracking document with at least one node corresponding to the second tracking document, wherein the generating of the first correlation comprises determining whether the first tracking document is correlated with another tracking document by recursively searching the hierarchical data structure to locate root nodes and leaf nodes associated with the at least one node corresponding to the first tracking document:

receiving, after beginning generation of the first correlation, a second batch of tracking documents associated with the logistics process, wherein the second batch of tracking documents comprises a third tracking document comprising a change in the logistics information indicated by the first tracking document of the first batch;

generating, based at least on the correlation feature and the change, a second correlation between the third tracking document of the second batch and the second tracking document of the first batch by adding one or more second links to the hierarchical data structure correlating the at least one node corresponding to the second tracking document with at least one node corresponding to the third tracking document; and sending, based at least on the second correlation, a status of the logistics process, the status indicating at least the change;

wherein the first correlation is assigned a source time indicating when the first tracking document is received, and wherein the operations further comprise:

determining whether the source time matches a creation time indicating when the third tracking document was received;

updating, based on a determination that the source time does not match the creation time, the first correlation to generate the second correlation; and storing the second correlation.

2. The system of claim 1, wherein the logistics process is tracked by the plurality of tracking documents, and wherein the logistics process comprises one or more events associated with placing an order, shipping the order, and/or receiving the order.

3. The system of claim 2, wherein the logistics information comprises a value indicative of a quantity of an item included in the order, a type of the item included in the order, a buyer of the item, a shipper of the item, a date of the order, a delivery date of the order, and/or a price of the order.

4. The system of claim 2, wherein the first tracking document comprises the order, an order item included in the order, an inbound delivery item for the order item, and/or shipment of the order including the inbound delivery item.

5. The system of claim 1, wherein the correlation feature comprises an identifier shared among at least the portion of the tracking documents to enable the first correlation and the second correlation.

6. The system of claim 1, wherein the determining of the correlation feature further comprises determining the correlation feature based on content derived from the plurality of tracking documents and/or based on an indication received via a user interface, wherein the received indication is used as the correlation feature.

7. The system of claim 1, wherein the correlation feature comprises a value indicative of an order, an order item included in the order, an inbound delivery item included in the order, and/or a shipment of the order.

8. The system of claim 7, wherein generating the first correlation comprises:

determining each of the first tracking document and the second tracking document contains the value or references another tracking document of the first batch of tracking documents that includes the value; and storing the first correlation between the first tracking document and the second tracking document to enable tracking of the logistics process.

9. The system of claim 1, wherein the second tracking document is associated with a shipment of an order and the first tracking document of the subset is associated with the order.

10. A computer-implemented method, comprising:

determining a correlation feature shared among at least a portion of a plurality of tracking documents comprising a first tracking document and a second tracking document, wherein a subset of the tracking documents including the first tracking document forms a hierarchical data structure including a plurality of nodes corresponding to the subset of the tracking documents and a plurality of links that correlate one of the plurality of nodes with another one of the plurality of nodes, and wherein the second tracking document includes a reference to the first tracking document but is excluded from the subset;

receiving a first batch of tracking documents associated with a logistics process, wherein the tracking documents comprise the correlation feature and logistics information associated with the logistics process, and wherein the first batch of tracking documents comprises the first tracking document and the second tracking document;

generating, based at least on the correlation feature, a first correlation between the first tracking document and the second tracking document by adding one or more first links to the hierarchical data structure correlating at least one node corresponding to the first tracking document with at least one node corresponding to the second tracking document, wherein the generating of the first correlation comprises determining whether the first tracking document is correlated with another tracking document by recursively searching the hierarchical data structure to locate root nodes and leaf nodes associated with the at least one node corresponding to the first tracking document;

receiving, after beginning generation of the first correlation, a second batch of tracking documents associated with the logistics process, wherein the second batch of tracking documents comprises a third tracking document comprising a change in the logistics information indicated by the first tracking document of the first batch;

generating, based at least on the correlation feature and the change, a second correlation between the third tracking document of the second batch and the second tracking document of the first batch by adding one or more second links to the hierarchical data structure correlating the at Least one node corresponding to the second tracking document with at least one node corresponding to the third tracking document; and sending, based at least on the second correlation, a status of the logistics process, the status indicating at least the change;

wherein the first correlation is assigned a source time indicating when the first tracking document is received, and wherein the method further comprises:

determining whether the source time matches a creation time indicating when the third tracking document was received;

updating, based on a determination that the source time does not match the creation time, the first correlation to generate the second correlation; and storing the second correlation.

11. The method of claim 10, wherein the logistics process is tracked by the plurality of tracking documents, and wherein the logistics process comprises one or more events associated with placing an order, shipping the order, and/or receiving the order.

12. The method of claim 11, wherein the logistics information comprises a value indicative of a quantity of an order item included in the order, a type of the order item included in the order, a buyer of the order item, a shipper of the order item, a date of the order, a delivery date of the order, and/or a price of the order, and wherein the first tracking document comprises the order, the order item included in the order, an inbound delivery item corresponding to the order item, and/or shipment of the order including the inbound delivery item.

13. The method of claim 10, wherein the correlation feature comprises an identifier shared among at least the portion of the tracking documents to enable the first correlation and the second correlation, wherein the determining of the correlation feature further comprises determining the correlation feature based on content derived from the plurality of tracking documents and/or based on an indication received via a user interface, wherein the received indication is used as the correlation feature, and wherein the correlation feature comprises a value indicative of an order, an order item included in the order, an inbound delivery item included in the order, and/or shipment of the order.

14. The method of claim 13, wherein generating the first correlation comprises:

determining each of the first tracking document and the second tracking document contains the value or references another tracking document of the first batch of tracking documents that includes the value; and storing the first correlation between the first tracking document and the second tracking document to enable tracking of the logistics process.

15. The method of claim 10, wherein the second tracking document is associated with a shipment of an order and the first tracking document of the subset is associated with the order.

16. A non-transitory computer readable medium storing instructions, which when executed by at least one data processor, result in operations comprising:

determining a correlation feature shared among at least a portion of a plurality of tracking documents comprising a first tracking document and a second tracking document, wherein a subset of the tracking documents including the first tracking document forms a hierarchical data structure including a plurality of nodes corresponding to the subset of the tracking documents and a plurality of links that correlate one of the plurality of nodes with another one of the plurality of nodes, and wherein the second tracking document includes a reference to the first tracking document but is excluded from the subset;

receiving a first batch of tracking documents associated with a logistics process, wherein the tracking documents comprise the correlation feature and logistics information associated with the logistics process, and wherein the first batch of tracking documents comprises the first tracking document and the second tracking document;

generating, based at least on the correlation feature, a first correlation between the first tracking document and the second tracking document by adding one or more first links to the hierarchical data structure correlating at least one node corresponding to the first tracking document with at least one node corresponding to the second tracking document, wherein the generating of the first correlation comprises determining whether the first tracking document is correlated with another tracking document by recursively searching the hierarchical data stricture to locate root nodes and leaf nodes associated with the at least one node corresponding to the first tracking document:

receiving, after beginning generation of the first correlation, a second batch of tracking documents associated with the logistics process, wherein the second batch of tracking documents comprises a third tracking document comprising a change in the logistics information indicated by the first tracking document of the first batch:

generating, based at least on the correlation feature and the change, a second correlation between the third tracking document of the second batch and the second tracking document of the first batch by adding one or more second links to the hierarchical data structure correlating the at least one node corresponding to the second tracking document with at least one node corresponding to the third tracking document; and sending, based at least on the second correlation, a status of the logistics process, the status indicating at least the change;

wherein the first correlation is assigned a source time indicating when the first tracking document is received, and wherein the operations further comprise:

determining whether the source time matches a creation time indicating when the third tracking document was received;

updating, based on a determination that the source time does not match the creation time, the first correlation to generate the second correlation; and storing the second correlation.

* * * * *